US009140460B2

(12) United States Patent
Woods et al.

(10) Patent No.: US 9,140,460 B2
(45) Date of Patent: Sep. 22, 2015

(54) CONTROL METHODS AND SYSTEMS FOR INDIRECT EVAPORATIVE COOLERS

(71) Applicant: ALLIANCE FOR SUSTAINABLE ENERGY, LLC, Golden, CO (US)

(72) Inventors: Jason Woods, Boulder, CO (US); Erik Kozubal, Superior, CO (US)

(73) Assignee: Alliance For Sustainable Energy, LLC, Golden, CO (US)

( * ) Notice: Subject to any disclaimer, the term of this patent is extended or adjusted under 35 U.S.C. 154(b) by 182 days.

(21) Appl. No.: 13/801,210

(22) Filed: Mar. 13, 2013

(65) Prior Publication Data

US 2014/0260372 A1     Sep. 18, 2014

(51) Int. Cl.
| | |
|---|---|
| *F25B 15/00* | (2006.01) |
| *F24F 3/14* | (2006.01) |
| *F24F 5/00* | (2006.01) |
| *F24F 1/00* | (2011.01) |

(52) U.S. Cl.
CPC .............. *F24F 3/1417* (2013.01); *F24F 5/0035* (2013.01); *F24F 2001/0092* (2013.01); *Y02B 30/62* (2013.01)

(58) Field of Classification Search
CPC ........ F25B 15/00; F25B 27/00; F25B 29/006; F25B 49/04; F25B 39/026
USPC ............. 62/94, 171, 271, 304, 314, 156, 129; 261/151, 156; 95/113, 125; 165/166
See application file for complete search history.

(56) References Cited

U.S. PATENT DOCUMENTS

| | | | |
|---|---|---|---|
| 4,224,927 A | 9/1980 | Patil | |
| 4,263,967 A | 4/1981 | McNab et al. | |
| 4,419,835 A | 12/1983 | Strain | |
| 4,544,513 A | 10/1985 | Otterbein | |
| 4,827,733 A * | 5/1989 | Dinh | ................................ 62/305 |
| 4,976,113 A | 12/1990 | Gershuni et al. | |

(Continued)

FOREIGN PATENT DOCUMENTS

| | | |
|---|---|---|
| CN | 1044527 | 8/1990 |
| CN | 1918435 | 2/2007 |

(Continued)

OTHER PUBLICATIONS

International Search Report, dated Nov. 13, 2013, for International Application PCT/US13/46762.

(Continued)

*Primary Examiner* — Mohammad M Ali
(74) *Attorney, Agent, or Firm* — John C. Stolpa

(57) ABSTRACT

A control method for operating an indirect evaporative cooler to control temperature and humidity. The method includes operating an airflow control device to provide supply air at a flow rate to a liquid desiccant dehumidifier. The supply air flows through the dehumidifier and an indirect evaporative cooler prior to exiting an outlet into a space. The method includes operating a pump to provide liquid desiccant to the liquid desiccant dehumidifier and sensing a temperature of an airstream at the outlet of the indirect evaporative cooler. The method includes comparing the temperature of the airstream at the outlet to a setpoint temperature at the outlet and controlling the pump to set the flow rate of the liquid desiccant. The method includes sensing space temperature, comparing the space temperature with a setpoint temperature, and controlling the airflow control device to set the flow rate of the supply air based on the comparison.

25 Claims, 20 Drawing Sheets

(56) References Cited

U.S. PATENT DOCUMENTS

| | | | |
|---|---|---|---|
| 5,351,497 A * | 10/1994 | Lowenstein | 62/94 |
| 5,390,505 A * | 2/1995 | Smith et al. | 62/173 |
| 5,493,871 A | 2/1996 | Eiermann | |
| 5,638,900 A | 6/1997 | Lowenstein | |
| 5,860,284 A | 1/1999 | Goland et al. | |
| 5,860,285 A | 1/1999 | Tulpule | |
| 6,178,762 B1 | 1/2001 | Flax | |
| 6,216,483 B1 * | 4/2001 | Potnis et al. | 62/271 |
| 6,247,604 B1 | 6/2001 | Taskis et al. | |
| 6,494,053 B1 * | 12/2002 | Forkosh et al. | 62/271 |
| 6,497,107 B2 | 12/2002 | Maisotsenko | |
| 6,514,321 B1 | 2/2003 | Lehto et al. | |
| 6,539,731 B2 | 4/2003 | Kesten | |
| 6,634,165 B2 * | 10/2003 | Tomlinson et al. | 60/39.3 |
| 6,684,649 B1 | 2/2004 | Thompson | |
| 6,731,523 B2 | 5/2004 | Jitaru | |
| 6,739,142 B2 | 5/2004 | Korin | |
| 6,841,601 B2 | 1/2005 | Serpico | |
| 6,854,278 B2 | 2/2005 | Maisotsenko | |
| 7,197,887 B2 | 4/2007 | Maisotsenko | |
| 7,758,671 B2 | 7/2010 | Kesten | |
| 7,987,682 B2 | 8/2011 | Reinders et al. | |
| 8,769,971 B2 | 7/2014 | Kozubal et al. | |
| 2002/0038552 A1 * | 4/2002 | Maisotsenko et al. | 62/121 |
| 2003/0014983 A1 | 1/2003 | Maisotsenko et al. | |
| 2003/0033821 A1 | 2/2003 | Maisotsenko et al. | |
| 2003/0106680 A1 | 6/2003 | Serpico | |
| 2004/0031282 A1 * | 2/2004 | Kopko | 62/271 |
| 2004/0061245 A1 | 4/2004 | Maisotsenko | |
| 2004/0112077 A1 * | 6/2004 | Forkosh et al. | 62/271 |
| 2004/0134212 A1 | 7/2004 | Lee et al. | |
| 2005/0109052 A1 | 5/2005 | Albers et al. | |
| 2005/0210907 A1 | 9/2005 | Gillan et al. | |
| 2005/0215728 A1 | 9/2005 | Cao | |
| 2005/0252229 A1 * | 11/2005 | Moratalla | 62/271 |
| 2007/0017235 A1 * | 1/2007 | Cai et al. | 62/157 |
| 2007/0056309 A1 | 3/2007 | Bhatti et al. | |
| 2007/0101746 A1 | 5/2007 | Schlom et al. | |
| 2009/0075581 A1 * | 3/2009 | Van Heeswijk et al. | 454/239 |
| 2009/0236317 A1 | 9/2009 | Yost et al. | |
| 2010/0000247 A1 | 1/2010 | Bhatti et al. | |
| 2010/0031817 A1 | 2/2010 | Ehrenberg | |
| 2010/0048942 A1 | 2/2010 | Knoesche | |
| 2010/0092888 A1 | 4/2010 | Buchine et al. | |
| 2010/0248449 A1 | 9/2010 | Hildreth et al. | |
| 2010/0273901 A1 | 10/2010 | Ehrenberg et al. | |
| 2010/0319370 A1 * | 12/2010 | Kozubal et al. | 62/92 |
| 2011/0108406 A1 | 5/2011 | Maisotsenko et al. | |
| 2011/0120685 A1 | 5/2011 | Van Heeswijk et al. | |
| 2011/0195652 A1 | 8/2011 | Smith | |
| 2011/0209858 A1 | 9/2011 | Konno | |
| 2012/0125020 A1 | 5/2012 | Vandermeulen et al. | |
| 2012/0125021 A1 | 5/2012 | Vandermeulen et al. | |
| 2012/0125031 A1 | 5/2012 | Vandermeulen et al. | |
| 2012/0125581 A1 | 5/2012 | Vandermeulen et al. | |
| 2012/0131934 A1 | 5/2012 | Vandermeulen et al. | |
| 2012/0131937 A1 | 5/2012 | Vandermeulen et al. | |
| 2012/0131938 A1 | 5/2012 | Vandermeulen et al. | |
| 2012/0131939 A1 | 5/2012 | Vandermeulen et al. | |
| 2012/0131940 A1 | 5/2012 | Vandermeulen et al. | |
| 2012/0132513 A1 | 5/2012 | Vandermeulen et al. | |
| 2012/0167600 A1 | 7/2012 | Dunnavant | |
| 2012/0186281 A1 | 7/2012 | Vandermeulen et al. | |
| 2013/0010423 A1 | 1/2013 | Carlson | |
| 2013/0340449 A1 | 12/2013 | Kozubal et al. | |

FOREIGN PATENT DOCUMENTS

| | | |
|---|---|---|
| JP | 59-066692 | 4/1984 |
| JP | 1099631 | 4/1989 |
| JP | 2002206834 | 7/2002 |
| JP | 2007147116 | 6/2007 |
| JP | 2007147117 | 6/2007 |
| WO | 8706682 | 11/1987 |
| WO | 9002305 | 3/1990 |
| WO | 02080295 | 10/2002 |
| WO | 2009094032 | 7/2009 |
| WO | 2011016847 | 2/2011 |
| WO | 2011161547 | 12/2011 |
| WO | 2012047938 | 4/2012 |

OTHER PUBLICATIONS

International Preliminary Report on Patentability and Written Opinion, dated Dec. 23, 2013, for International Application PCT/US13/46762.

Woods et al., "A desiccant-enhanced evaporative air conditioner: Numerical modal and experiments," Energy Conversion and Management, 65 SI, pp. 208-220, Jan. 2013.

Kozubal et al., "Desiccant Enhanced Evaporative Air-Conditioning (DEVap); Evaluation of a New Concept in Ultra Efficient Air Conditioning," NREL/TP5500-49722, Jan. 2011.

Kozubal et al., "Development and Analysis of Desiccant Enhanced Evaporative Air Conditioner Prototype," NREL/TP-550-54755, Apr. 2012.

Conde-Petit et al., "Open Absorption System for Cooling and Air Conditioning Using Membrane Contactors—Final Report," Publication 280139, Jul. 8, 2008.

Conde-Petit, et al., "Open Air Absorption System for Cooling and Air4 Conditioning Using Membrane Contactors—Annual Report 2005," Publication 260097, Jan. 30, 2006.

Conde-Petit, "Liquid Desiccant-Based Air-Conditioning Systems," LDACS, Proc. of the 1st European Conference on Polygeneration—Technologies and Applications, pp. 217-234, A. Coronas, ed., Oct. 16-17, 2007, Spain.

Conde-Petit, "Open Absorption System for Cooling and Air Conditioning Using Membrane Contactors," Proceedings, '15, Schweizerisches Status-Seminar <<Energie-und Umweltforschung im Bauwesen>>, Sep. 11-12, 2008, Switzerland.

El-Dessouky et al., "A novel air conditioning system: Membrane air drying and evaporative cooling," IchemE., Chemical Research and Design, vol. 78, Issue 7, pp. 999-1009, Oct. 2000.

Al-Sulaiman et al, "Liquid Desiccant based two-stage evaporative cooling system using reverse osmosis (RO) process for regeneration," A;;lied Thermal Engineering, vol. 27, Issues 14-15, pp. 2449-2452, Oct. 2007.

International Search Report, dated Sep. 25, 2008, for International Application PCT/US08/52016.

International Preliminary Report on Patentability and Written, dated Jul. 27, 2010, for International Application PCT/US08/52016.

06-22JP, SN 544285/2010 Japanese OA dated Jun. 5, 2012 and English Translation.

06-22CN SN 2008801282188 Chinese OA dated Mar. 6,13 and English Translation.

06-22CN SN 2008801282188 Chinese OA dated Aug. 27, 2013 and English Translation.

Conde-Petit, et al., Open Absorption System for Cooling and Air Conditioning Using Membrane Contactors< Publication 260098, Nov. 14, 2006.

\* cited by examiner

US 9,140,460 B2

CONTROL METHODS AND SYSTEMS FOR INDIRECT EVAPORATIVE COOLERS

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Air conditioning is used worldwide to provide comfortable and healthy indoor environments that are properly ventilated and cooled and that have adequate humidity control. While being useful for conditioning supply air, conventional air conditioning systems are costly to operate as they use large amounts of energy (e.g., electricity). With the growing demand for energy, the cost of air conditioning is expected to increase, and there is a growing demand for more efficient air conditioning methods and technologies. Additionally, there are increasing demands for cooling technologies that do not use chemicals and materials, such as many conventional refrigerants, that may damage the environment if released or leaked. Maintenance is also a concern with many air conditioning technologies, and, as a result, any new technology that is perceived as having increased maintenance requirements, especially for residential use, will be resisted by the marketplace.

Evaporative coolers are used in some cases to address air conditioning demands or needs, but, due to a number of limitations, conventional evaporative coolers have not been widely adopted for use in commercial or residential buildings. Evaporative coolers, which are often called swamp coolers, are devices that use simple evaporation of water in air to provide cooling in contrast to conventional air conditioners that use refrigeration or absorption devices using the vapor-compression or absorption refrigeration cycles. The use of evaporative cooling has typically been limited to climates where the air is hot and humidity is low such as in the western United States. In such dry climates, the installation and operating costs of a conventional evaporative cooler can be lower than refrigerative air conditioning. Residential and industrial evaporative coolers typically use direct evaporative cooling with warm dry air being mixed with water to change the water to vapor and use the latent heat of evaporation to create cool moist air (e.g., cool air with a relative humidity of 50 to 70 percent). For example, an evaporative cooler may be provided in an enclosed metal or plastic box with vented sides containing a fan or blower, an electric motor to operate the fan, and a water pump to wet evaporative cooling pads. To provide cooling, the fan draws ambient air through vents on the unit's sides and through the dampened pads. Heat in the air evaporates water from the pads, which are continually moistened to continue the cooling process. The cooled, moist air is then delivered to the building via a vent in the roof or a wall.

While having an operation cost of about one fourth of refrigerated air conditioning, evaporative coolers have not been widely used to address needs for higher efficiency and lower cost conditioning technologies. One problem with many sump coolers is that in certain conditions these evaporative coolers cannot operate to provide adequately cooled air. For example, air may only be cooled to about 75° F. when the input air is 90° F. and 50 percent relative humidity, and such cooling may not be adequate to cool a particular space. The problem may get worse as temperatures increase such as to temperatures well over 100° F., as found in many locations in the southwest portion of the United States and elsewhere. As a result, the air conditioning system may need to include refrigerated air conditioning to cool the outlet air from the evaporative cooler, which results in a system that is more expensive to purchase, operate, and maintain.

Additionally, conventional evaporative coolers provide no dehumidification of the air and, in fact, often output air at 80 to 90 percent relative humidity, which may only be acceptable in very dry environments as very humid air reduces the rate of evaporation for occupants of the building (e.g., reduces comfort levels) and can cause condensation resulting in corrosion or other problems. Dehumidification is provided as a second or later stage in some evaporative coolers such as by wicking a liquid desiccant along a wall of the air flow channel or chamber, but such systems have not been widely adopted due to increased operating and maintenance costs and concerns of having the desiccant expelled with the conditioned air. In general, maintenance is a concern with conventional evaporative coolers as the evaporation process can result in mineral deposits on the cooling pads and other surfaces of the cooler that need to be cleaned or replaced to maintain the efficiency of the system, and the water supply line needs to be protected against freezing during the off season such as by draining the system. Due to these and other concerns, conventional evaporative cooling is unlikely to be widely used to provide an energy efficient, air conditioning alternative for commercial and residential applications until significant improvements are made that address maintenance concerns while improving achievable cooling (e.g., providing adequately cooled output air for direct use in a building).

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

Briefly, a control method is provided for operating a cooling system with an indirect evaporative cooler to maintain a temperature and a humidity of an enclosed space (e.g., a space within a building). The method includes operating an airflow control device to provide supply air at a flow rate to a liquid desiccant dehumidifier. The supply air flows through the liquid desiccant dehumidifier and an indirect evaporative cooler prior to being ejected from an outlet of the indirect evaporative cooler in fluid communication with a space. The method includes operating a pump to provide liquid desiccant at a flow rate to the liquid desiccant dehumidifier and also sensing a temperature of an airstream at the outlet of the indirect evaporative cooler. Further, the method includes comparing the temperature of the airstream at the outlet to a setpoint temperature at the outlet and then controlling the operating of the pump to set the flow rate of the liquid desiccant based on the comparing step.

In some cases, the IEC control method may also include sensing a temperature of the space, comparing the temperature of the space with a setpoint temperature for the space, and controlling the operating of the airflow control device to set the flow rate of the supply air based on the comparing of the temperature of the space with the setpoint temperature for the space. In such cases, the controlling steps may be performed using feedback control of the air control device and the pump. Then, the feedback control may be provided using at least one of deadband control, proportional control, and proportional-integral-differential (PID) control.

In some implementations, the method includes determining the setpoint temperature at the outlet as a function of a temperature of the space. While in other cases, the method includes controlling an airflow control device to provide exhaust airflow through the indirect evaporative cooler based on a comparison of the temperature of the airstream at the outlet to a minimum setpoint temperature for the outlet. In these methods, the minimum setpoint temperature for the outlet is determined based on a temperature of the space. It may also be useful for the method to include controlling an airflow control device to provide exhaust airflow through the liquid desiccant dehumidifier based on the flow rate of the liquid desiccant to the liquid desiccant dehumidifier and based on the temperature of the airstream at the outlet. While in other cases, it may be useful to have the method include selectively operating a regenerator for the liquid desiccant to maintain the flow rate to the liquid desiccant dehumidifier within a predefined flow rate range.

In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

Figure 18:
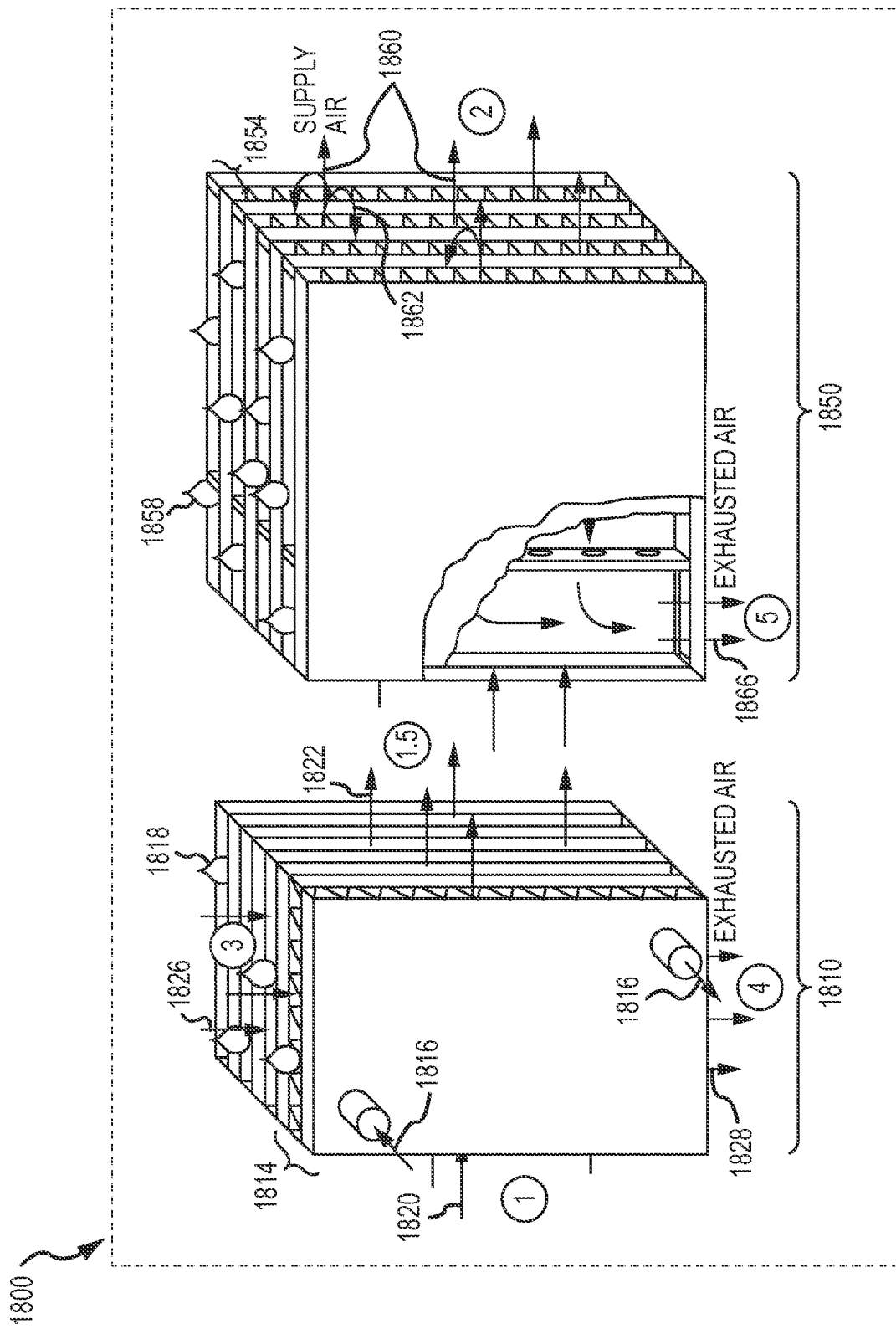
Figure 19:
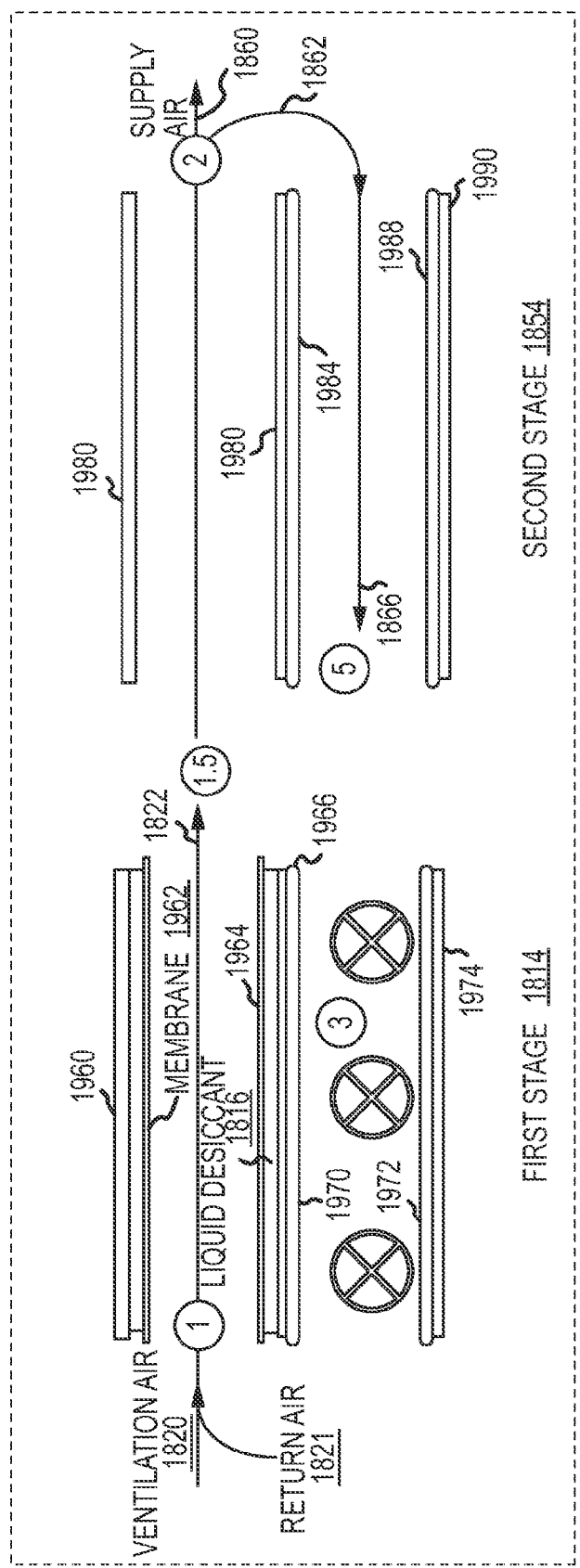
Figure 20:
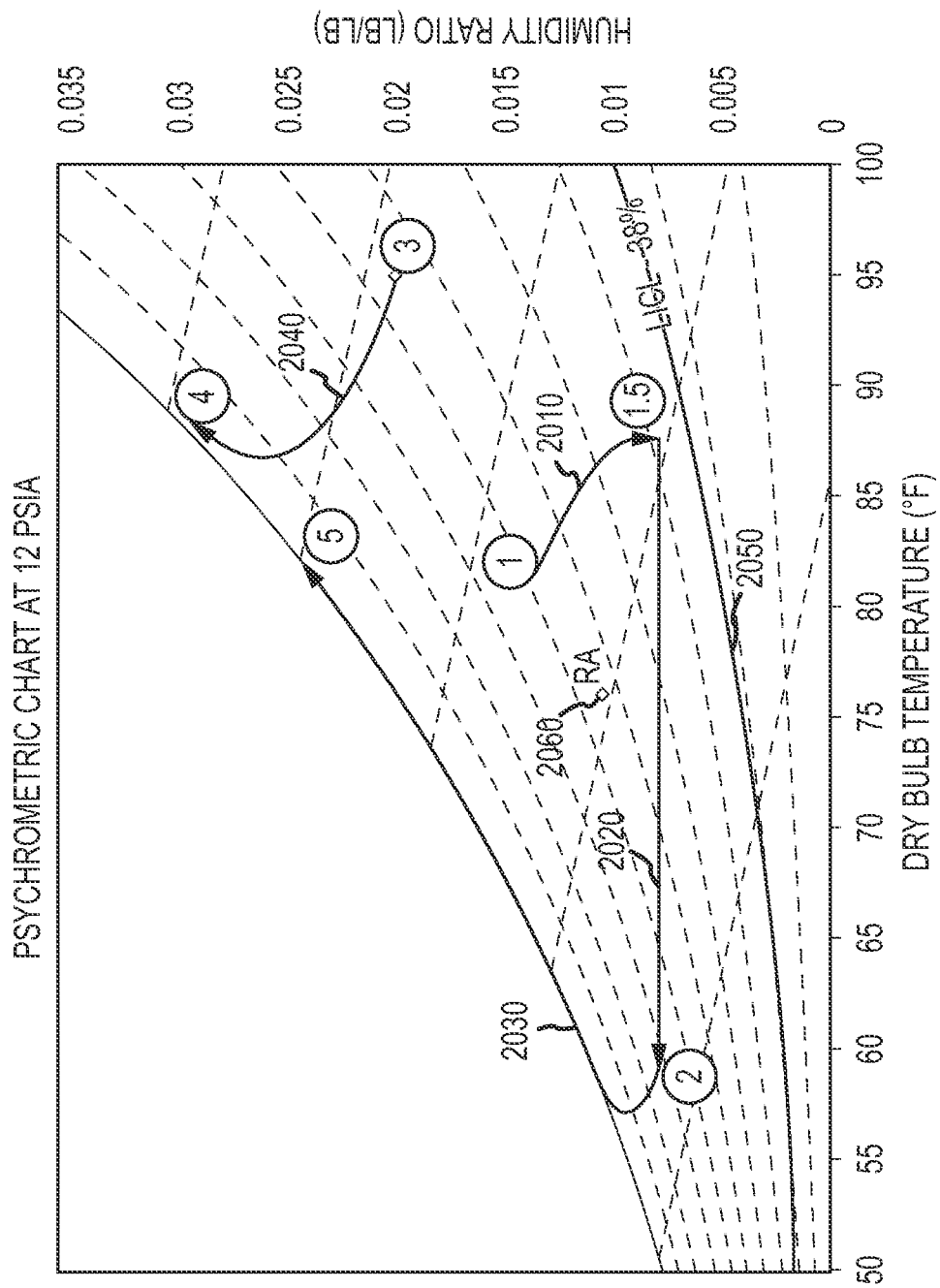
Figure 21:
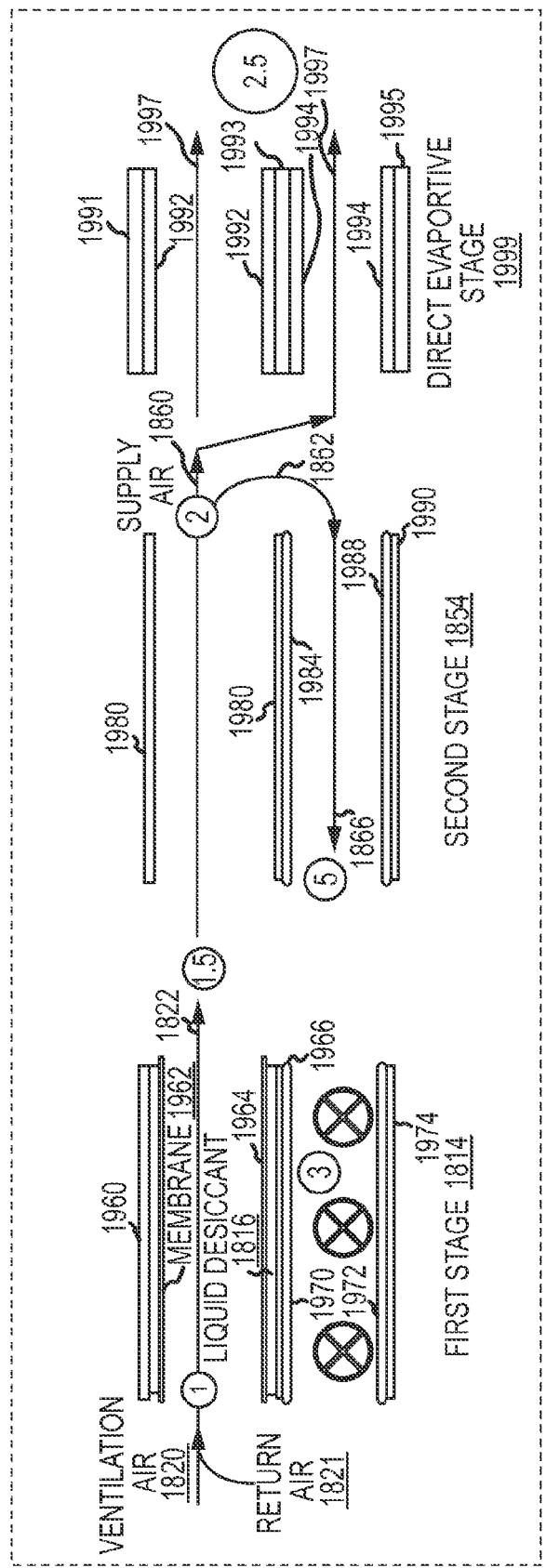
Figure 22:
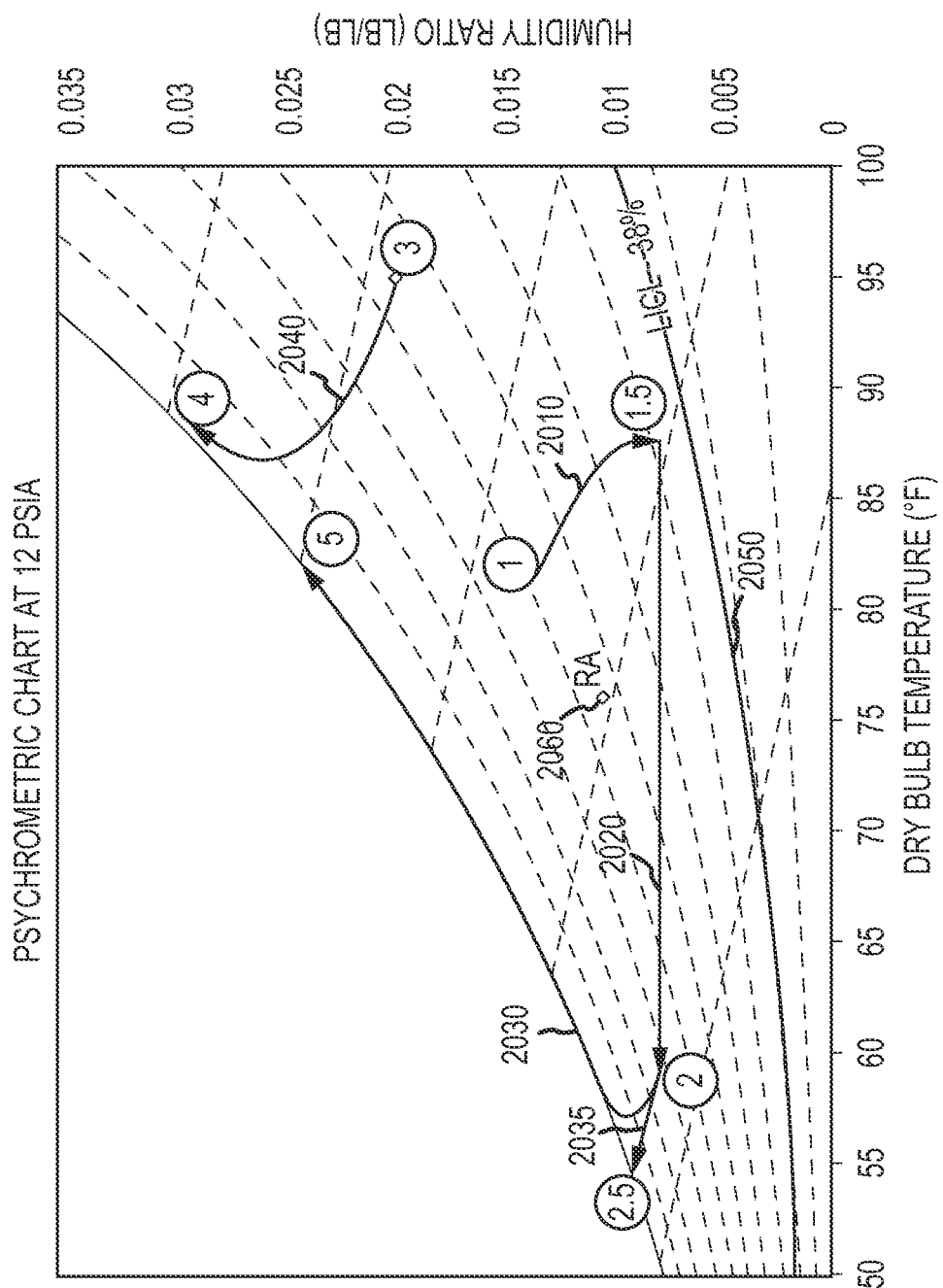
Figure 23:
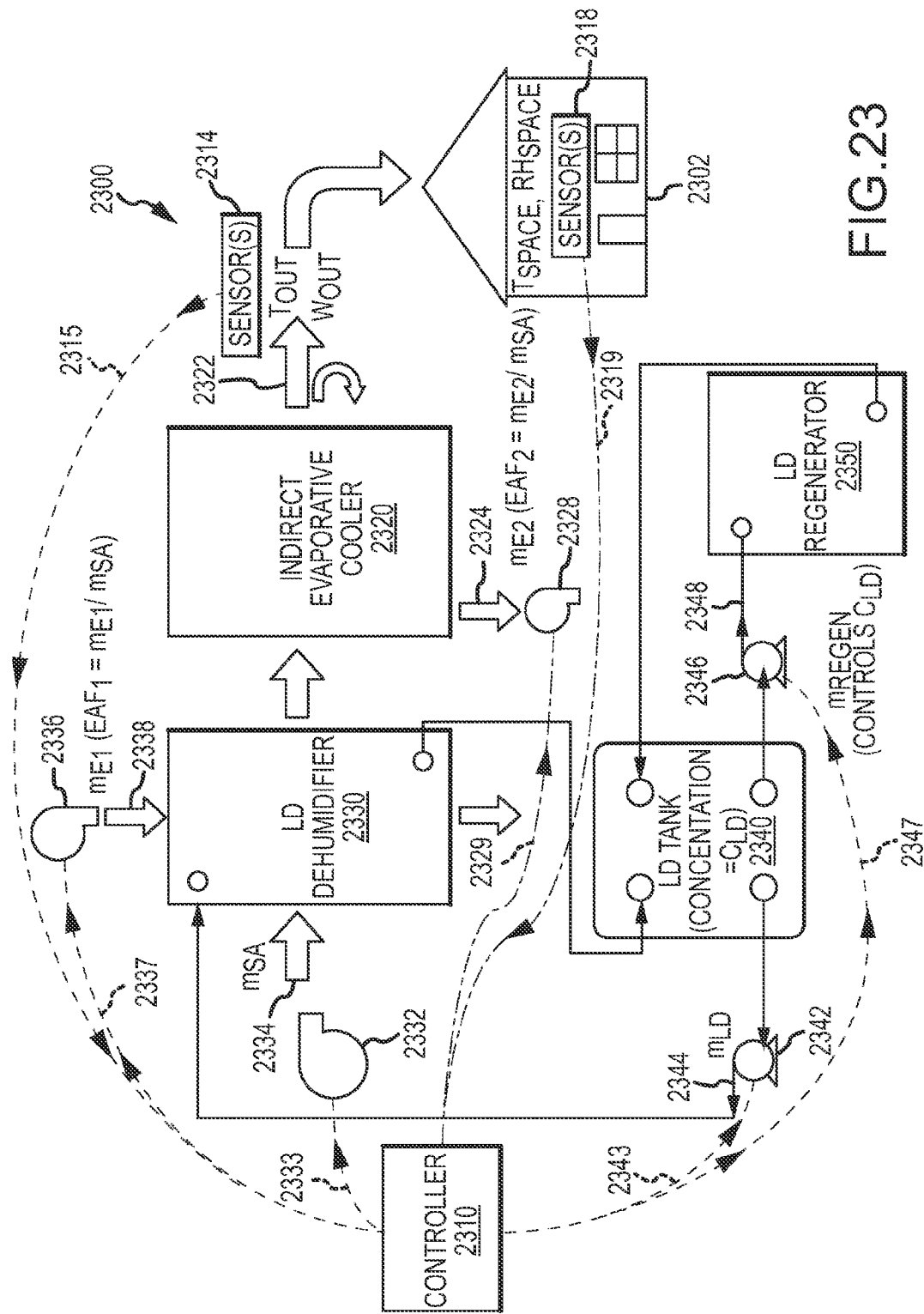
Figure 24:
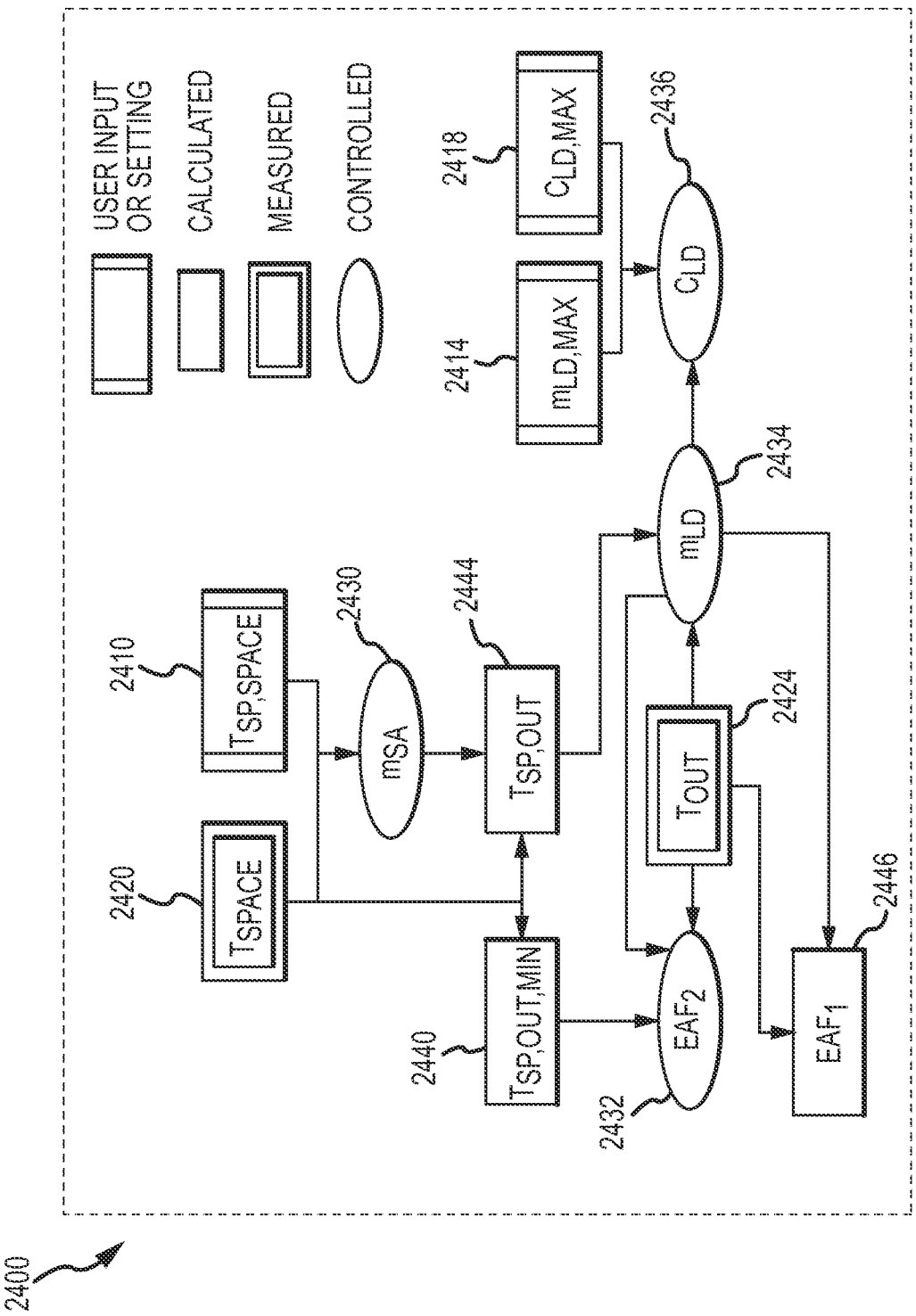
Figure 25:
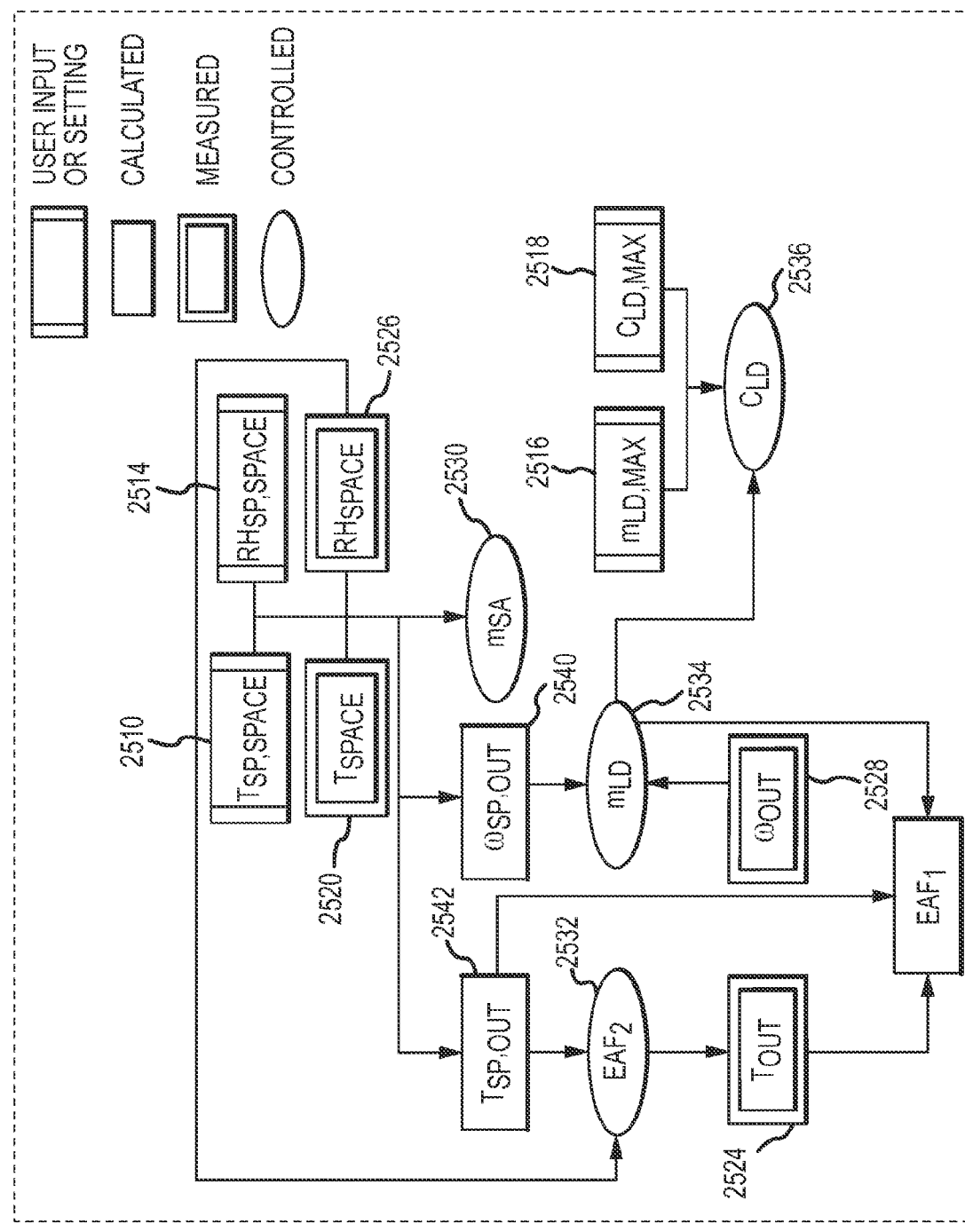

FIGS. 18, 19, and 20 provide, respectively, a schematic side view of a two-stage evaporative cooler, a top view of a pair of first and second stage stacks used to form the cooler, and a psychrometric chart of the cooling process provided during operation of the two-stage evaporative cooler;

FIGS. 21 and 22 provide, respectively, a top view of a cooler similar to that of FIG. 19 but with an added direct evaporative stage and a psychrometric chart of the cooling process during operation of the cooler;

FIG. 23 illustrates a schematic or functional block drawing of a cooling (or air conditioner) system including an IEC and a control assembly adapted for controlling system to efficiently utilize the IEC;

FIG. 24 is a control flow diagram for implementing a control method for cooling systems with one or more IECs based on use of temperature sensors; and FIG. 25 is a control flow diagram similar to that of FIG. 24 for implementing a control method for cooling system with one or more IECs on use of temperature sensors and also humidity sensors/measuring devices.

DESCRIPTION

With regard to FIGS. 1-22, the following describes several techniques for implementing an indirect evaporative cooler (IEC) including ones where no membrane is used on the water (or coolant) side of the device and liquid desiccant is contained by a vapor permeable membrane. Again, some of these IECs may be labeled or considered desiccant-enhanced evaporative (DEVAP) coolers or air conditioners. The description with reference to FIGS. 1-22 then also discusses implementations of IECs that provide water containment and spreading by flocked or wicked surfaces without a membrane (e.g., these aspects are added to the originally described IECs of FIGS. 1-22). Further, a direct evaporative cooler stage is added in some implementations to allow for extra sensible cooling.

The inventors recognized that prior even with this understanding of IEC design and manufacture understood that controlling operation of IECs differs significantly from other cooling systems and devices. With that in mind, systems and methods for controlling IECs have developed that allow for effective and efficient operation of most (if not all) IECs including those that use liquid desiccant to condition product air. Hence, beginning with FIG. 23 and after the description of a number of useful IEC embodiments, methods and systems for controlling IECs including, but not limited to the IECs and/or DEVAP air conditions described herein, are described in detail.

The following provides a description of exemplary indirect evaporative coolers with dehumidification and mass/heat transfer assemblies for such coolers that provide inlet air stream chambers with sidewalls defined by permeable membrane sheets containing liquid desiccant. The assemblies also include outlet or exhaust air stream chambers (such as in counterflow to the inlet air streams) with sidewalls defined by permeable membrane sheets containing coolant such as water. In embodiments described below, the membrane is "permeable" in the sense that moisture in the form of a vapor (e.g., water in the vapor state) generally can permeate readily through the membrane such as from an inlet supply air and from liquid coolant via evaporation. However, the membrane generally contains or blocks moisture in the form of a liquid from flowing through as it is instead directed to flow within the channel or chamber. In some cases, water in the liquid state is contained by the membrane at pressures less than about 20 psi and more typically less than about 5 psi. The coolant and the liquid desiccant in some embodiments are maintained at pressures below about 2 psi, and the permeable membrane contains moisture such as water in the liquid state while water vapor permeates the membrane.

As will become clear from the following description, use of the assemblies such as for evaporative coolers or mass/heat exchangers provides a number of benefits. The inlet or process air stream can be cooled and dehumidified simultaneously or in a single chamber/stage, and this combined action reduces system size and cost as well as the number of required components and equipment (e.g., do not require a multi-stage unit or device to cool and then to dehumidify and/or further cool with refrigerant or the like). The combination of liquid desiccant dehumidification with indirect evaporative cooling provides very high energy transfer rates due to evaporation and absorption. The design creates a liquid desiccant system that does not require separate equipment for liquid desiccant cooling (e.g., a separate cooling tower or chiller). The stacked arrangements or multi-layered mass/heat transfer assemblies (or manifolded flow chambers/channels) enable ultra-low flow liquid desiccant designs. This is due in part to the enhanced geometry of the assembly and its ability to decrease the liquid desiccant's temperature to a lower temperature than achievable with traditional cooling tower technologies. Hence, in the cooler, there are higher concentration gradients of liquid desiccant (e.g., more than 20 percentage points of lithium chloride (LiCl) and similar gradients for other desiccants), which provides the following advantages: (a) a higher thermal coefficient of performance (COP) to regenerate the desiccant (i.e., to remove water from the desiccant) for reuse in the cooler; (b) less desiccant storage requirements due to better utilization; and (c) ability to use desiccants that are less expensive than LiCl such as calcium chloride (CaCl), which may not be used in conventional systems because their absorption properties are not as favorable as LiCl but lower temperature operation provided by the cooler embodiments described herein makes the properties of this and other "weaker" desiccants more acceptable or favorable.

The use of membranes as chamber sidewalls facilitates fabrication of counter-flow and counter-flow with pre-cooled exhaust air embodiments. Liquid desiccant containment with water molecule-permeable membranes eliminates liquid desiccant "carry over" in which small droplets of desiccant are passed into the air stream as is a concern with direct contact arrangements. The embodiments described herein also provide considerable reduction or even elimination of deposited solids during the process of water evaporation or adsorption (and liquid flow rates can be maintained at levels that are high enough to further control potential deposits) whereas fouling leads to increased maintenance and operating costs with prior evaporative coolers.

Figure 1:
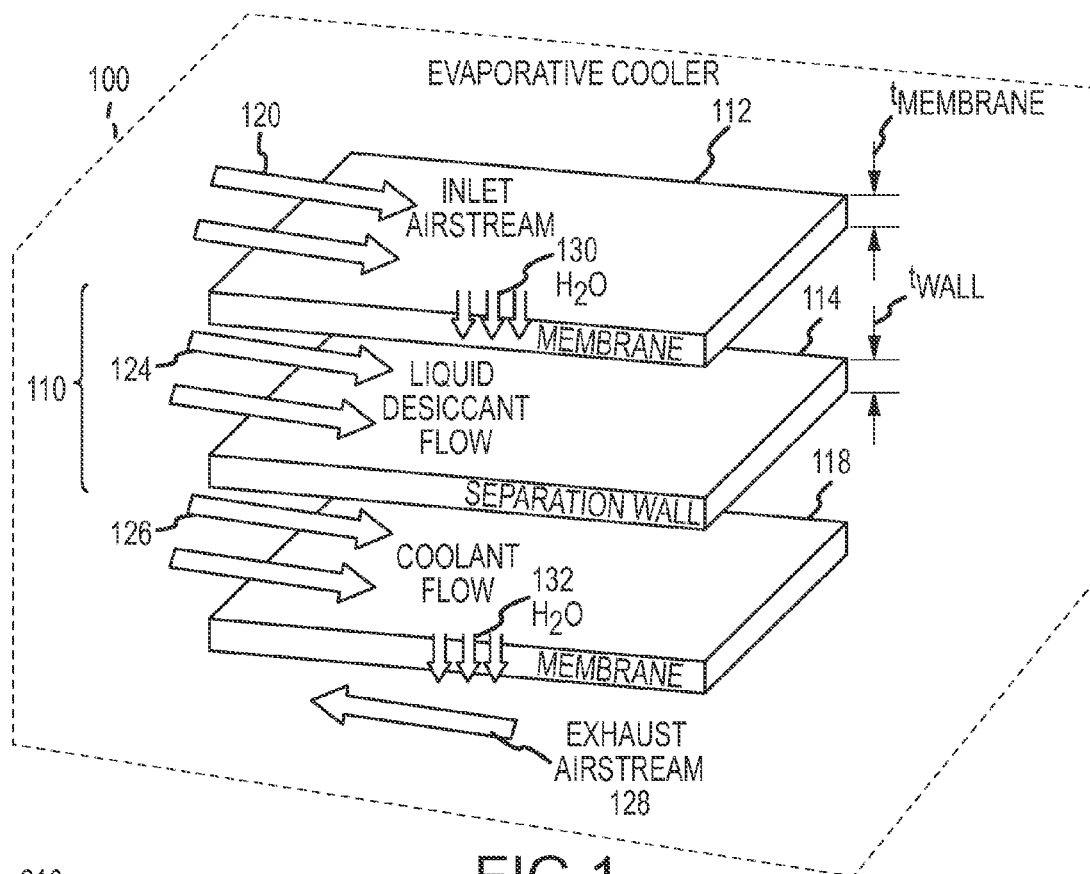
FIG. 1 illustrates in schematic form an evaporative cooler or heat exchanger including an exemplary representative of a permeable membrane stack or assembly for use in providing indirect evaporative cooling concurrently with dehumidification in an integral unit or single stage.

FIG. 1 illustrates in a schematic an evaporative cooler (or mass/heat exchanger) 100 that is useful for providing concurrent or simultaneous dehumidifying and cooling of a process or inlet air stream 120 (e.g., outdoor or process air to be cooled and conditioned prior to being fed into a building ventilation system). The cooler 100 is shown in simplified form with a housing shown in dashed lines, without inlet and outlet ducts, plumbing, and/or manifolds. Also, the cooler 100 is shown with a single mass/heat transfer stack 110 whereas in a typical cooler 100 there would be numerous stacks 110 provided by repeating the configuration shown (e.g. by alternating the liquid passed through the chamber defined by the membrane and wall) to provide an assembly with a plurality of air and liquid flow channels or chambers to provide the desired mass and heat transfer functions described for the stack 110.

As shown, an inlet air stream 120 is directed in a chamber or channel defined in part by a sheet or layer of a membrane 112. Liquid desiccant 124 flows in an adjacent chamber or channel on the other side of the membrane 112. The liquid desiccant 124 is contained by the membrane 112, which is permeable to water molecules in a liquid or vapor state but generally not to the components of the liquid desiccant 124. The chamber for the desiccant flow 124 is also defined by a sheet or layer of material that is impermeable to fluid flow (i.e., a separation wall) 114 so as to contain the liquid desiccant 124 in the chamber or flow path. The chamber for stream 120 is also defined by an opposing membrane (not shown) that is used to contain another flow of liquid desiccant. In this manner, heat is passed or removed from the inlet air stream 120 and transferred to the liquid desiccant flow 124 (and the desiccant behind the opposite sidewall/membrane (not shown)). Concurrently, the inlet air stream 120 is dehumidified as water 130 is removed by passing through the permeable membrane 112 into liquid desiccant 124.

The liquid (or gas) desiccant 124 may take many forms to act to dehumidify and cool the air stream 120 as it passes over the membrane 112. Desiccant 124 is generally any hygroscopic liquid used to remove or absorb water and water vapor from an air stream such as stream 120. Preferably, the desiccant 124 chosen would be a regenerable desiccant (e.g., a desiccant that can have the absorbed water separated and/or removed) such as a glycol (diethylene, triethylene, tetraethylene, or the like), a salt concentrate or ionic salt solution such as LiCl, CaCl, or the like, or other desiccants. The membrane 112 may be formed of any material that functions to contain liquid desiccant 124 and, typically, coolant 126 (e.g., water or the like) while also being permeable to molecules of water in liquid or vapor state. For example, polymer membranes may be used that have pores that are about the size or just bigger than a water molecule and, in some cases, that are also adapted to provide water molecules with high mobility through the membrane 112. In one particular embodiment, the membrane 112 is formed from a membrane material as described in detail U.S. Pat. No. 6,413,298 to Wnek, which is incorporated in its entirety herein by reference. The membrane material may also be obtained from a number of distributors or manufacturers such as, but not limited to, Dias-Analytic Corporation, Odessa, Fla., U.S.A. The membranes 112, 118 and separation wall 114 preferably also are formed from materials that are resistive to the corrosive effects of the desiccant, and in this regard, may be fabricated from a polymer or plastic with the wall 114 in some cases being formed of a corrosion resistant metal or alloy, which provides a higher thermal conductivity compared with a plastic.

The embodiment 100 shown is configured for counter-flow of the pre-cooled exhaust air stream 128 (relative to the inlet air stream 120). Other embodiments may use cross (at about a 90 degree flow path) or quasi-counter flow (e.g., not directly counter or opposite in direction but transverse such as a greater than 90 degree angle flow path relative to air stream 120). The exhaust air stream 128 flows in a channel or chamber defined by a sheet or layer of membrane (e.g., second or lower membrane) 118 and an upper membrane of another stack (not shown). The separation wall 114 and membrane 118 define a flow chamber or channel for coolant flow 126, which is typically a flow of water or the like. Heat is transferred from the liquid desiccant 124 to the coolant 126 through the separation wall, and the coolant 126 is cooled as heat and mass (e.g., water or other moisture 132) is transferred to the exhaust stream 128 via membrane 118. Heat transfer is not shown but generally is flowing through the membrane 112 to the liquid desiccant 124, through the separation wall 114 from the liquid desiccant 124 to the coolant 126, and through the membrane 118 from the coolant 126 to the exhaust air stream 128. The membranes 112, 118 are relatively thin with a thickness, $t_{mem}$, that typically is less than 0.25 inches and more typically less than about 0.1 inches such as 100 to 130 microns or the like. The membrane 112, 118 may have a tendency to expand outward if unrestrained, and, in some embodiments, such as that shown in FIG. 3, a divider or "flow field" support is provided in the inlet air stream 120 and exhaust air stream 128 (i.e., in the airflow chambers) to maintain the separation of the adjacent membranes (e.g., a plastic or metallic mesh with holes or openings for air flow and a zig-zag, S or W-shaped, or other cross section (or side view) that provides many relatively small contact points with the membranes 112, 118). The separation wall 114 also typically is relatively thin to facilitate heat transfer between the desiccant 124 and coolant 126 such as with a thickness, $t_{wall}$, of less than 0.125 inches or the like. The flow chambers for the air, desiccant, and coolant are also generally relatively thin with some applications using chambers less than 1 inch thick (or in depth) while others use chambers less than about 0.5 inches such as about 0.25 inches or less.

Figure 2:
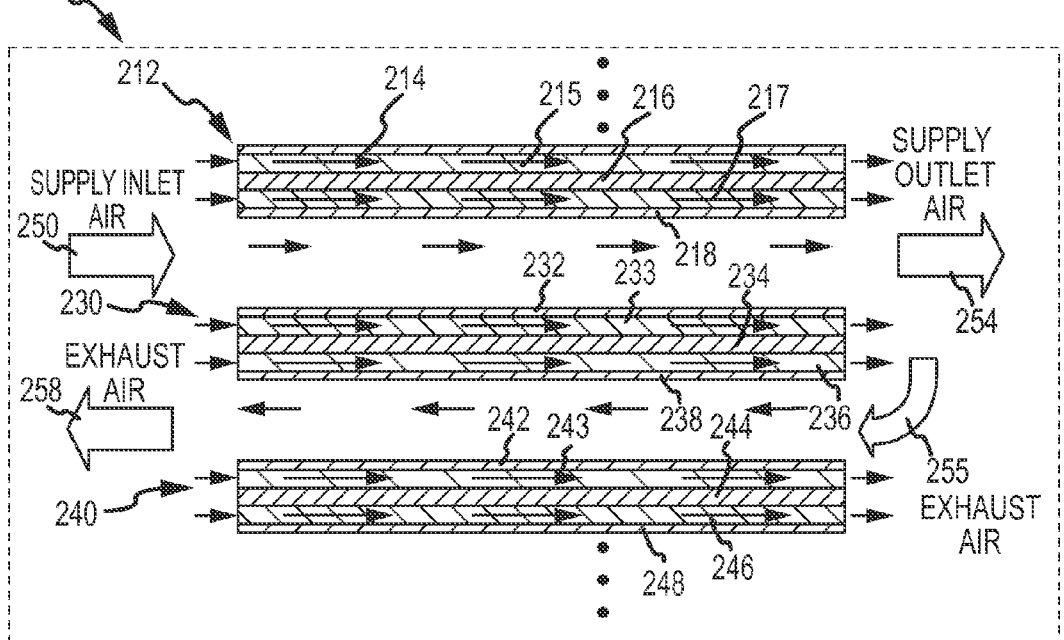
FIG. 2 illustrates another an exemplary representation of an evaporative cooler showing an assembly of membrane/wall/membrane stacks used in combination to direct the supply and exhaust airflows relative to membrane-contained liquid desiccant and coolant (e.g., cooling water) to achieve cooling and dehumidification.

FIG. 2 illustrates an indirect evaporative cooler 210 utilizing the membrane/separation wall/membrane stack or assembly configuration to provide a mass/heat transfer exchanger device in which dehumidification and cooling occur within a single stage and, therefore, an integral or unitary device. In some embodiments (not shown), there is no desiccant side membrane or desiccant flow. Thus, these embodiments are useful for providing an indirect evaporative cooler in which the membrane contains liquid coolant but not liquid desiccant and the membrane typically would not be provided on the supply air side (or in these channels) to provide better heat transfer surfaces with the separation wall. As shown in FIG. 2, the cooler 210 includes a mass/heat transfer assembly formed from stacks or devices 212, 230, 240 and such an assembly of stack would typically be repeated to provide a plurality of inlet and exhaust air, coolant, and desiccant flow channels or chambers in the cooler 210. As shown, each set of stacks (or layered assemblies or devices) 212, 230, 240 is formed similarly to include a membrane, a separation wall, and a membrane, with the membrane being permeable to water on the molecular level to allow mass and heat transfer and the wall being impermeable (or nearly so) to only allow heat transfer and not mass transfer.

Specifically, the stack 212 includes an upper membrane layer 214, a separation wall 216, and a lower membrane layer 218. Dividers or spacers (not shown) would typically be provided to space these layers apart to define flow channels for coolant 215 and for liquid desiccant 217. For example, the separators may be configured to also provide a connection to a supply line for coolant and for regenerated desiccant, provide a manifold(s) to direct flow through the various stacks 212, 230, 240, and provide a connection to a return line for the coolant and diluted desiccant. The stacks 230 and 240 likewise include an upper membrane layer 232, 242, a separation wall 234, 244, and a lower membrane layer 238, 248. The stack 240 has coolant (such as water) 243 directed in the chamber between the upper membrane 242 and wall 244 and desiccant 246 flowing between the wall 244 and lower membrane layer 248 similar to stack 212. In contrast, the stack 230 has liquid desiccant 233 directed to flow in the chamber defined by the upper membrane layer 232 and wall 234 and has coolant 236 directed to flow in the chamber or channel defined by the wall 234 and lower membrane layer 238.

The cooler 210 includes ducting and the like (not shown) to direct supply inlet air 250 through the channel or flow path between the stack 212 and the stack 230. The arrangement of the stacks 212, 230, 240 and contained fluids results in the supply inlet air 250 being passed over the surfaces of the membranes 218, 232 that are containing liquid desiccant 217, 233. As a result, supply outlet air 254 is output that is dehumidified as moisture in the air 250 is absorbed by the desiccant 217, 233 via permeable membrane 218, 232, and the air 254 is also cooled by the interaction with desiccant 217, 233. The cooling effect in the cooler 210 is in part effected by a fraction of supply outlet air 254 being redirected in the cooler 210 by ducting/manifolds (not shown) to flow as pre-cooled exhaust air 255 through the channel or flow path between stacks 230, 240 to be output as warmer and moister air 258. Heat passes from desiccant 233 through wall 236 to coolant 236 (with similar heat transfer occurring in stacks 212, 240), and the coolant 236 is able to transfer heat and mass (e.g., water molecules) via membrane 238 to the incoming exhaust air 255. As discussed above, the stack pattern or set provided by 212, 230, 240 would typically be repeated within the cooler 210 to create a mass/heat transfer assembly with numerous, parallel flow channels for air, coolant, and desiccant.

Figure 3:
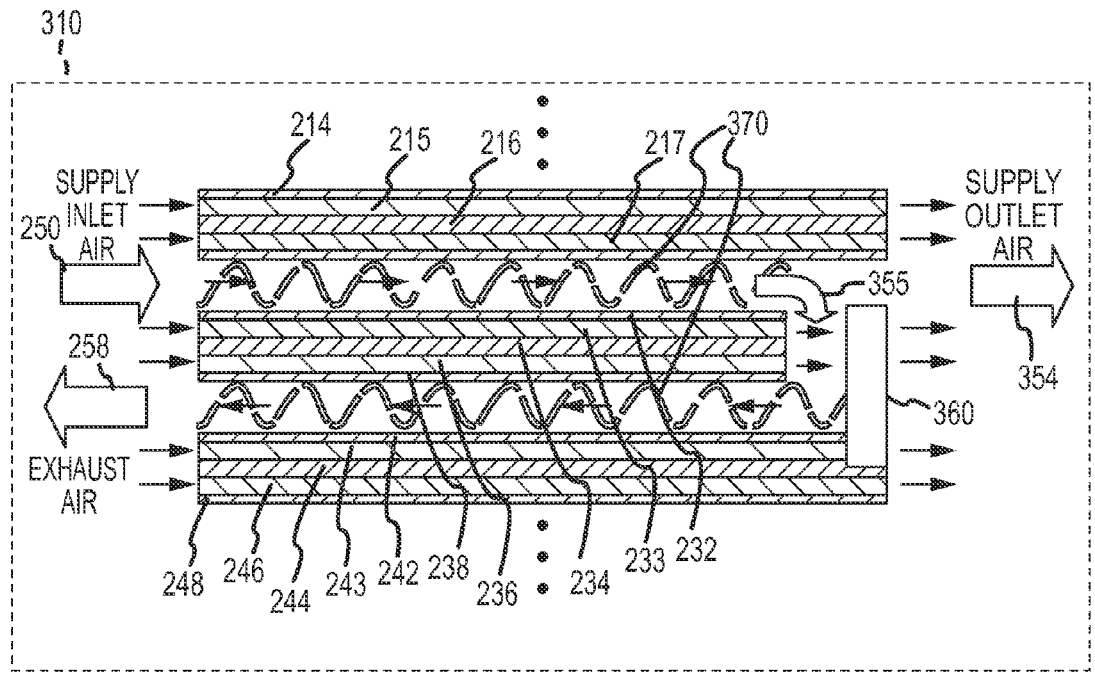
FIG. 3 illustrates an evaporative cooler similar to that shown in FIG. 2 but being configured with integral counterflow passages for exhaust/cooled air.

The cooler 210 is shown as a counter flow exchanger, but other flow patterns may be used to practice the desiccant-based dehumidification and cooling described herein. For example, cross flow patterns may readily be established as well as quasi (or not fully opposite) counter flow patterns. These patterns may be achieved by altering the manifolding and/or ducting/plumbing of the cooler as well as the dividers provided between the stacks. Additionally, the counter flow passages may be provided integral to the stack assembly rather than externally as is the case in the cooler 210. For example, the cooler 310 has a similar stack arrangement as shown in the cooler 210 of FIG. 2 except that it includes a counterflow baffle or dividing wall 360 on the end of the flow channels for inlet air 250 and exhaust air 258. The counterflow divider 360 allows a majority of the cooled air to exit the stacks as supply outlet air 354 (e.g., more than about 50 percent and more typically 60 to 90 percent or more of the air flow 250). A smaller portion (e.g., a volume equal to the make up outdoor air or the like) is directed by divider 360 to flow between stacks 230, 240 as pre-cooled exhaust air 355. FIG. 3 also illustrates the use of a divider or flow field baffle 370 that functions to maintain a separation of membranes in the stacks 212, 230, 240 (or at about their original thickness rather than puffed out or expanded as may occur with some permeable membranes). The dividers 370 may take many forms such as a mesh with a wavy pattern (e.g., an S or W-shaped side or cross sectional view), with the mesh selected to provide as little resistance to air flow as practical while still providing adequate strength. Also, it is desirable to limit the number of contact points or areas with the membranes as these can block moisture transfer from the air 250 and to the air 355.

Figure 4:
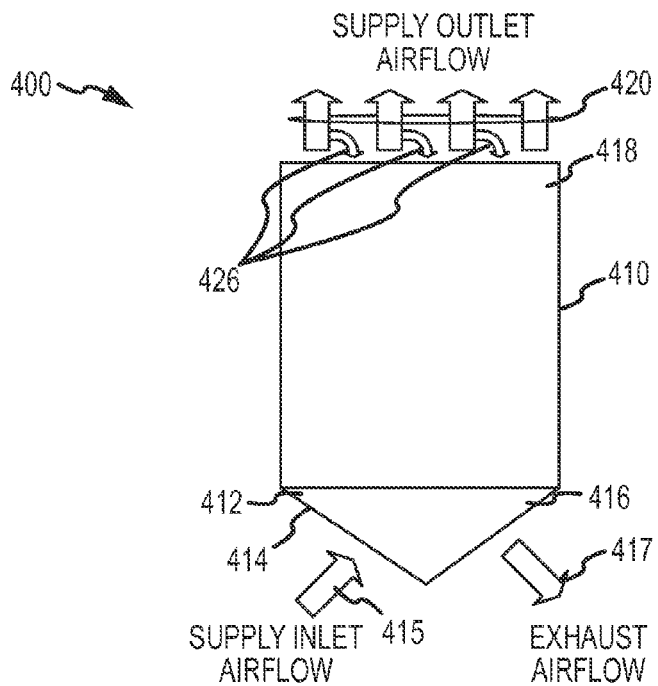
FIG. 4 is a top view of an exemplary heat exchanger illustrating air flows through a plurality of channels or chambers provided by membrane-based assemblies such as those shown in FIGS. 1-3 or other embodiments shown or described herein.

FIG. 4 illustrates an indirect evaporative cooler 400 of one embodiment. A housing 410 is provided for supporting a mass/heat transfer assembly such as one formed with the stack sets shown in FIGS. 1-3 and 15-19. As shown, the housing 410 includes a first end 412 with an inlet 414 for supply inlet airflow 415 and an outlet 416 for exhaust airflow 417. The cooler 4100 further includes a second end 418 opposite the first end 412 that provides an outlet or vent for directing supply outlet airflow 420 to an end-use device or system (e.g., an inlet or supply for return air to a building). The second end 418 is also configured to redirect a portion 426 of the cooled (and, in some operating modes, dehumidified) air 426 for use in counter flow cooling of the supply inlet airflow 415. A prototype of the cooler 400 was fabricated with a stack assembly as shown in FIG. 2 with 32 desiccant channels. The prototype was tested with 10 liters per minute (LPM) flow (or about 0.3 LPM per desiccant channel). Coolant was provided as water at a water flow rate of about 1.25 to 2.00 times the evaporation rate. The evaporation rate for this prototype was about 1.33 gallons/ton-hr or about 5 liters/ton-hr, which provides a water or coolant flow rate of about 6-10 liters/ton-hr of cooling. Of course, these are exemplary and not limiting flow rates, and it is expected that the flow rates of liquid desiccant and coolant will depend on numerous factors and will be matched to a particular channel design and cooling need as well as other considerations.

Figure 5A:
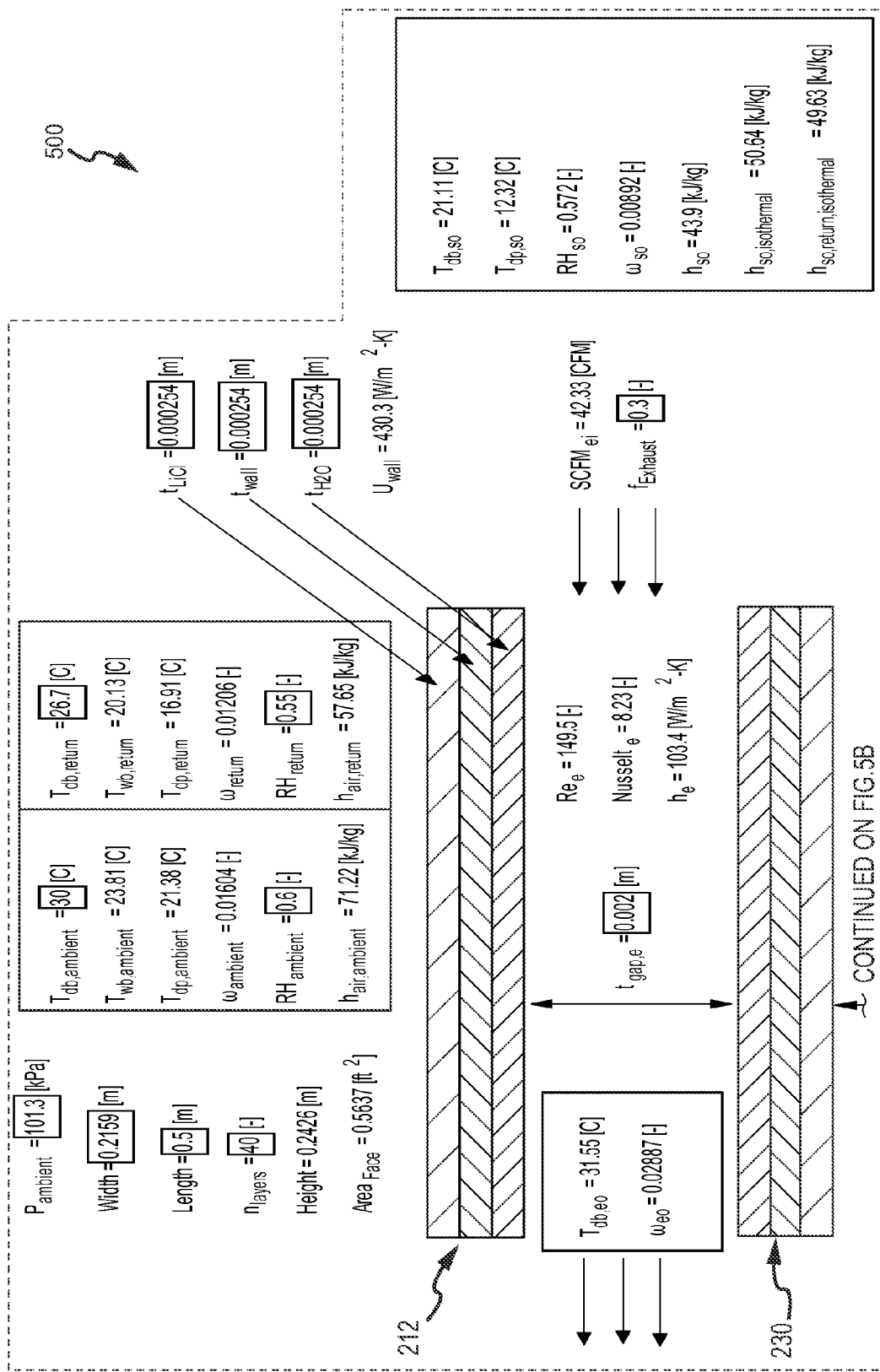
FIGS. 5A-5B illustrates an exemplary modeling of an evaporative cooler or counterflow heat/mass exchanger such as one with the stack assembly shown in FIG. 2 and flow arrangement shown in FIG. 4.
Figure 5B:
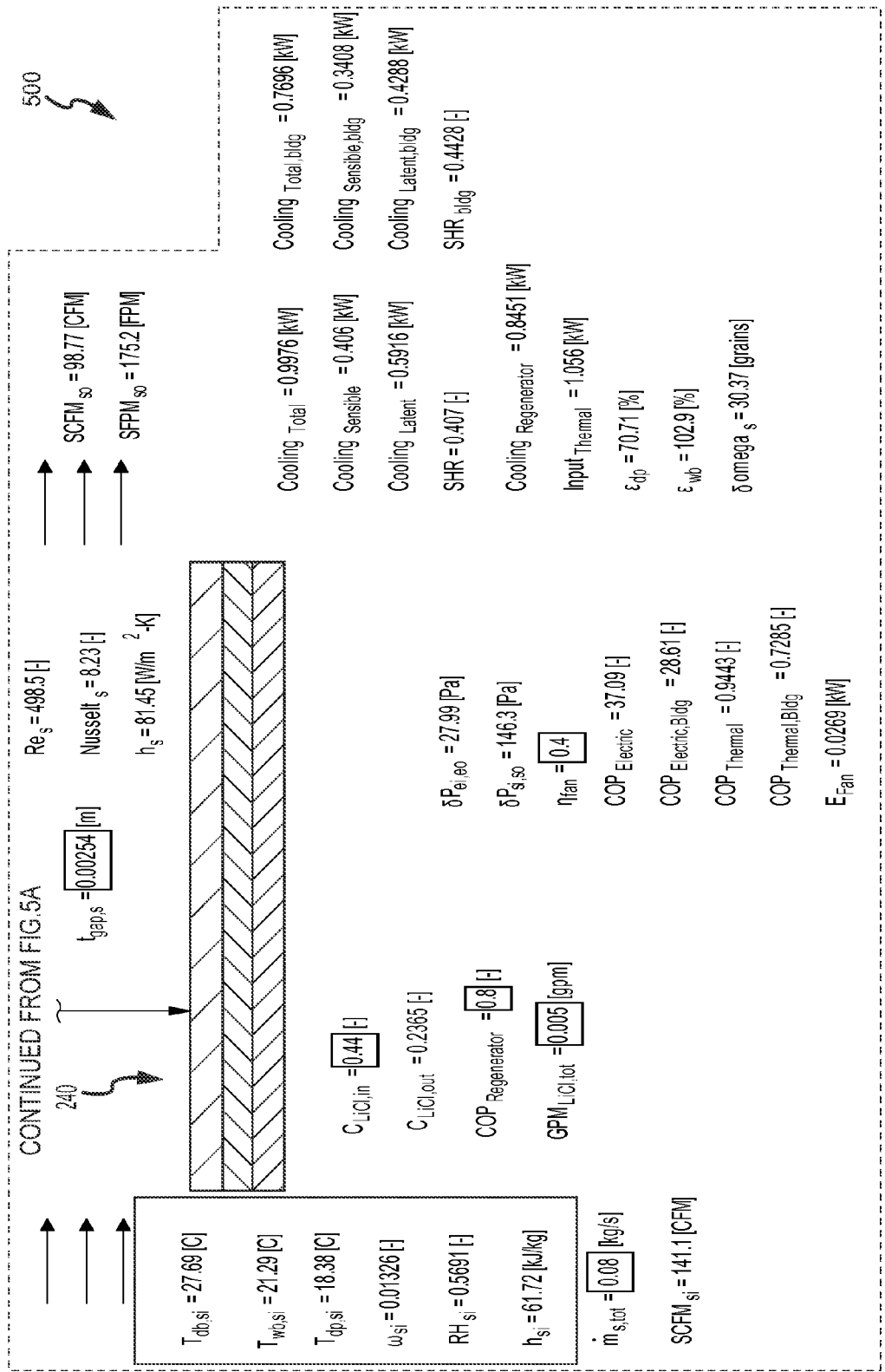

An indirect evaporative cooler such as the cooler 400 using stack sets as shown in FIG. 2 (or FIGS. 15-19) may be modeled to determine the effectiveness of the use of a permeable membrane to contain coolant and liquid desiccant. FIGS. 5A-5B provides a diagram 500 of such modeling showing use of stacks 212, 230, and 240 as discussed with reference to FIG. 2 to cool inlet or process air and to also dehumidify this air in the same stage or process. The inputs to the model 500 are shown, and results for a typical inlet air condition are provided, with results and modeling being performed in this case with Engineering Equation Solver (EES). The numeric values shown in boxes or with squares around them are input values (or assumed typical operating conditions), and the values outside or without boxes are outputs or results of the modeling. The modeling results shown in the diagram 500 are believed to be self-explanatory to those skilled in the heating, ventilation, and air conditioning (HVAC) arts and do not require detailed explanation to understand the achieved effectiveness of the embodiments using membrane containment in indirect evaporative coolers; however, the following provides a graphical description of some of the results in the model 500.

Figure 6:
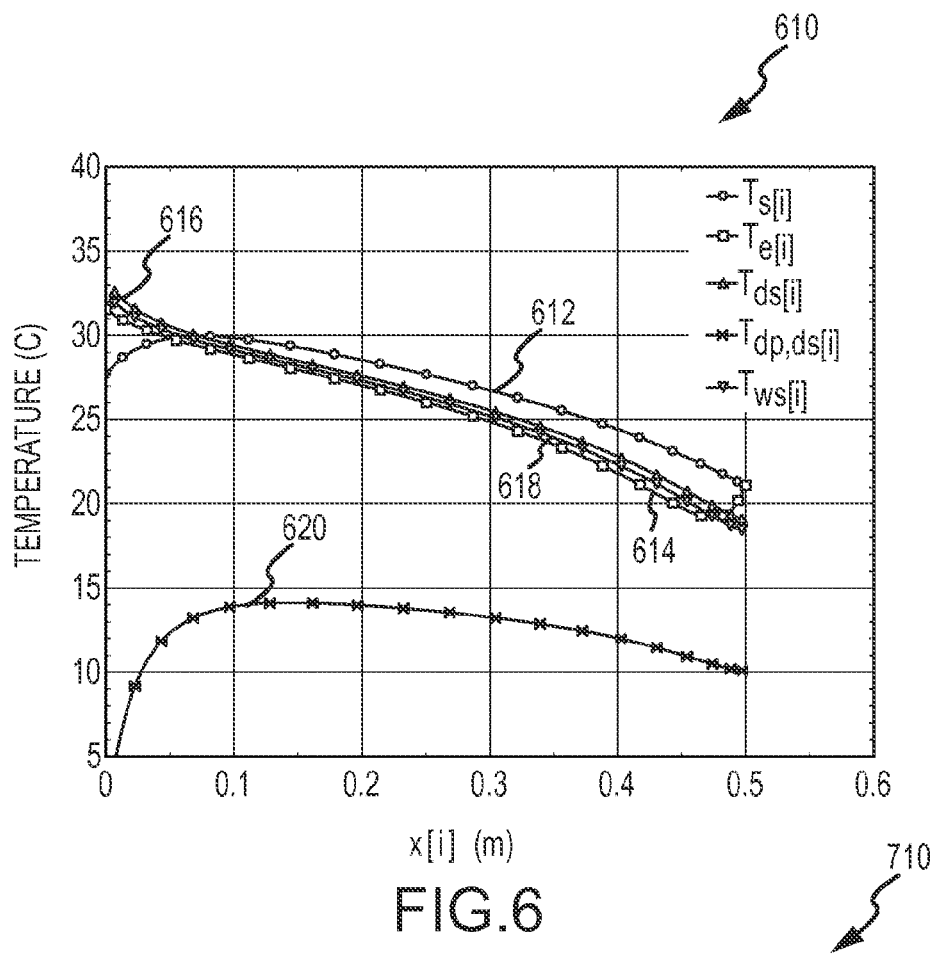
FIG. 6 is a graph of air flow and surface temperatures along the length of the exchanger modeled as shown in FIGS. 5A-5B.

FIG. 6 illustrates a graph or diagram 610 showing the temperatures of the air flows in the channels between the stacks (e.g., in an evaporative cooler using such mass/heat transfer assembly described herein). The graph 610 also shows surface temperatures along the length of the counterflow mass/heat exchanger (e.g., exchanger 400 with stack arrangements as shown in FIG. 2). Specifically, the graph 610 shows the temperature of supply air with line 612, the temperature of exhaust/purge air with line 614, the temperature of the desiccant side membrane surface (e.g., at the interface of the membrane and the supply air) with line 616, the dewpoint temperature of the desiccant side membrane surface (e.g., at the interface of the membrane and the supply air) with line 620, and the temperature of the water side membrane surface (e.g., at the interface of the membrane and the exhaust/purge air) with line 618.

Figure 7:
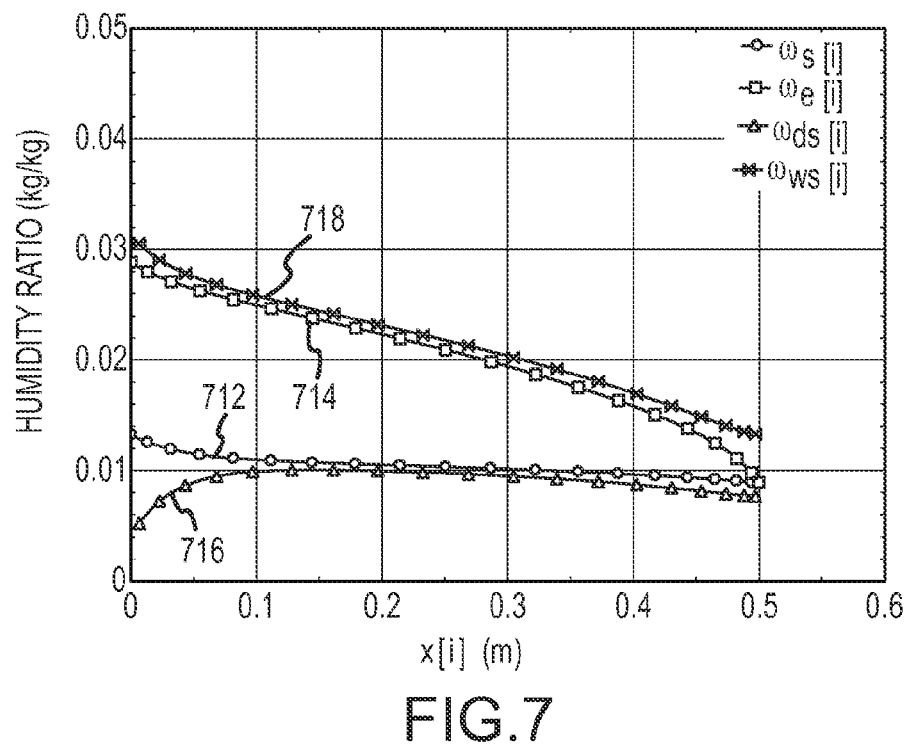
FIG. 7 is a graph of humidity ratios of the air along the length of the exchanger modeled as shown in FIGS. 5A-5B.

FIG. 7 is a graph or diagram 710 showing the humidity ratios of the air along the length of the counterflow heat/mass exchanger. Specifically, the graph 710 shows the bulk humidity ratio of the supply air with line 712, the bulk humidity ratio of exhaust/purge air with line 714, the humidity ratio of the air in close proximity to the desiccant side membrane surface (e.g., at the interface of the membrane and the supply air) with line 716, and the humidity ratio of the air in close proximity to the water side membrane surface (e.g., at the interface of the membrane and the exhaust/purge air) with line 718.

Figure 8:
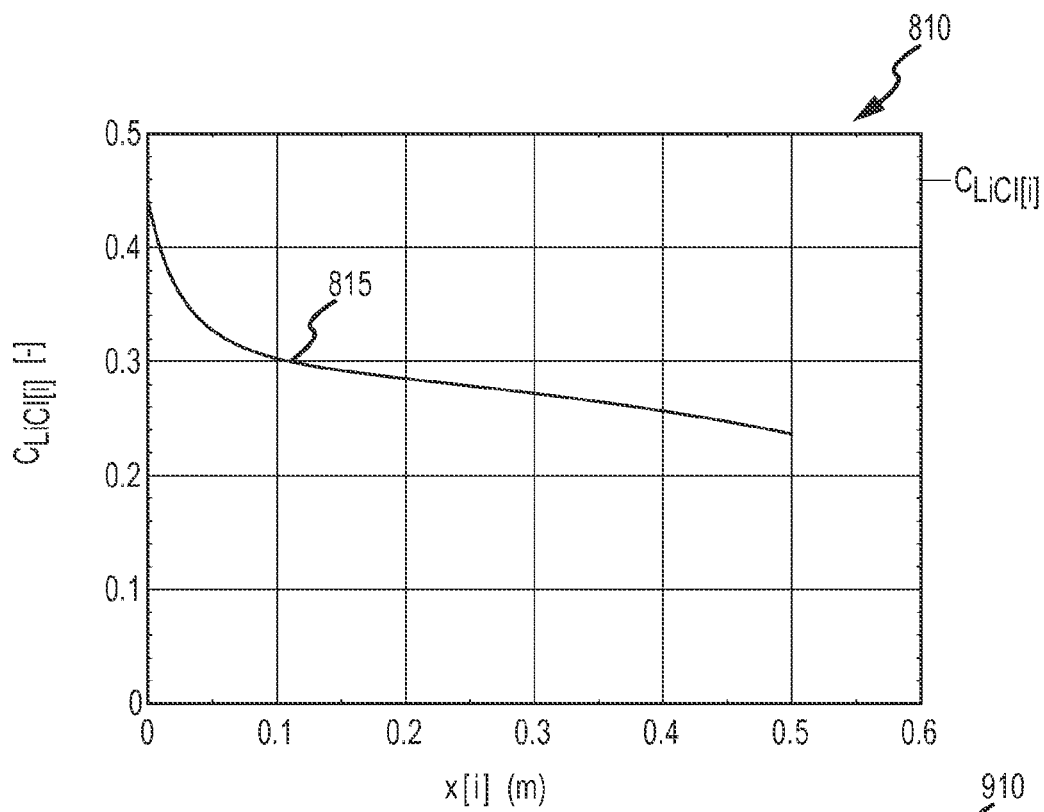
FIG. 8 is a graph showing concentration of liquid desiccant flowing through the modeled heat exchanger of FIGS. 5A-5B.

FIG. 8 illustrates a graph 810 showing with line 815 the concentration of desiccant (in this particular modeling the desiccant is LiCl) as it flows concurrent with the supply air flow down the length of the counterflow mass/heat exchanger. As shown with line 815, the desiccant is getting weaker as it flows through the channel between the membrane and the separation wall as it absorbs water molecules from the air, e.g., the concentration of the desiccant is dropping from about 44 percent down to about 24 percent in this particular modeling example (which results from the membrane being characterized as permeable (at a particular input rate or setting) to water molecules in the flowing air at these operating conditions).

Figure 9:
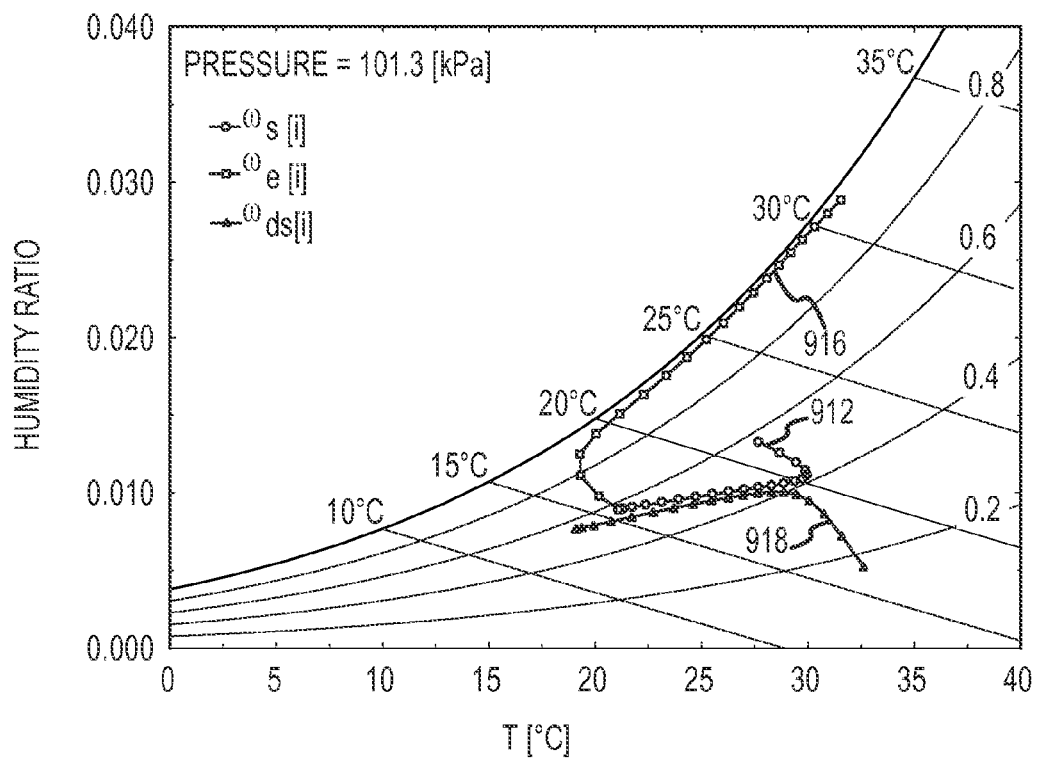
FIG. 9 is a psychrometric chart showing the cooling and dehumidifying process modeled as shown in FIGS. 5A-5B.

FIG. 9 shows the process of model 500 of FIGS. 5A-5B in a psychrometric chart 910. The supply air shown with line 912 can be seen to be gradually losing humidity (in kilograms water vapor/kilograms dry air or $kg_v/kg_{da}$). The supply air 912 has its temperature initially rise slightly due to the large heat flow of vapor sorption into the desiccant. As the supply air 912 continues down the length of the exchanger (or flow channel or chamber between membrane layers or walls of adjacent stacks containing liquid desiccant), the temperature then drops to a cooler/drier condition than at the inlet. At the exit of the exchanger, the supply air 912 is split into two streams. The majority of the air is supplied to the cooled space, and the minority of the air (such as less than about 50 percent and more typically less than about 30 percent of the volume) gets funneled into the exhaust/purge side (or exhaust/counterflow channels between the membrane walls containing coolant) of the heat/mass exchanger or cooler, which is shown with the line 916. The exhaust air 916 has a low dewpoint, and, thus, it can pick up a large amount of heat evaporatively. The pre-cooled exhaust or purge air 916 picks up water vapor (and associated heat of vaporization) from the wet side channel. The air 916 exits out of the unit with a much higher enthalpy than either the supply inlet or exit shown with line 912. The diagram 910 also shows the humidity ratio and temperature of the supply air in close proximity to the desiccant side membrane surface (ds) with line 918.

The following table shows results in tabulated form for modeling of FIGS. 5A-5B for inlet and outlet air flows. As shown, a wide range of temperatures and humidity levels can be chosen and input into the model 500. In the configuration whose results are shown in the table, the equivalent wet bulb effectiveness with the desiccant flow turned off (e.g., in some operating modes it may not be required or useful to utilize the desiccant to dehumidify the air) would be 113 percent, which means the cooler is able to cool the supply air below the inlet wet bulb temperature.

TABLE

Inlet and outlet conditions from model runs (° F. and kg/kg)

| Run # | $T_{supply,in}$ | $T_{supply,out}$ | $T_{exhaust,out}$ | $\omega_{supply,in}$ | $\omega_{supply,out}$ | $\omega_{exhaust,out}$ |
|---|---|---|---|---|---|---|
| 1 | 27.7 | 21.11 | 31.55 | 0.0133 | 0.00892 | 0.0289 |
| 2 | 50.0 | 33.7 | 50.7 | 0.0319 | 0.0179 | 0.0834 |
| 3 | 50.0 | 20.7 | 41.0 | 0.0077 | 0.00406 | 0.0494 |
| 4 | 30.0 | 13.1 | 27.2 | 0.00262 | 0.00158 | 0.0226 |
| 5 | 30.0 | 18.9 | 42.55 | 0.0269 | 0.0137 | 0.0547 |
| 6 | 15.0 | 16.9 | 25.4 | 0.0105 | 0.00418 | 0.0207 |
| 7 | 15.0 | 11.9 | 20.0 | 0.00528 | 0.00203 | 0.0147 | where LiCl Inlet Concentration = 44%; flow ratio (flow exhaust/(flow exhaust + flow supply) = 0.3; supply outlet face velocity = 175 SCFM; and ambient pressure = 101.3 kPa.

The cooler 210 of FIG. 2 (or FIGS. 15-19) may be thought of as a desiccant-enhanced, indirect evaporative cooler that utilizes a membranes or layers of membrane material that is permeable to water molecules to provide desired liquid containment. A standard psychrometric chart (such as one at 14.7 psi ambient pressure and other typical parameters) may be used to view lines of equal sensible heat ratios (SHRs) originating at a typical room setpoint. For vapor compression dehumidification, a SHR of less than about 0.7 is difficult to attain without reheat (e.g., given reasonable evaporator temperatures). Also, it is psychrometrically impossible to attain a SHR of less than about 0.6 without reheat, and attempting such a SHR often leads to frozen evaporator coils that require defrost cycles. The desiccant-enhanced, indirect evaporative cooler, such as shown in FIG. 2 at 200, addresses this problem with a unique, new process (as has been described above and is presented in more detail below).

It may be useful at this point to review the process with reference to FIGS. 2 and 3. FIGS. 2 and 3 show diagrams describing the inner flow channels of the unit or assembly for use in an evaporative cooler 210, 320. The mixed return/outdoor air is shown by the arrow 250 (e.g., return air from a conditioned space along with outdoor make up air such as 400 cfm/ton supply and 175 cfm/ton outdoor air or the like). The air 250 is dehumidified by the desiccant 217, 233 through the membrane 218, 232. This lowers both the dew point and temperature of this air stream until it is output at 254 or 354. At the exit of the supply air passage (between the liquid desiccant-containing membranes), a portion of the air is fractioned off as shown with arrows 255 and 355 and sent through an adjacent passage (between the coolant-containing membranes 238, 242) which picks up moisture from the water layer 236, 243 through the membrane 238, 242. The heat of evaporation is a source of cooling that acts to remove the sensible heat and heat of absorption from the supply air stream 250. This air is then exhausted (purged) out at 254, 354.

Heat exchanger configuration shown at 400 in FIG. 4 has been built in the laboratory by the inventors and was modeled as shown in FIGS. 5A-5B. Other options for flow/housing designs are shown in configuration with the cooler 1000 of FIG. 10 and the cooler 1100 of FIG. 11. The cooler 1000 is shown to have a housing 1010 with a first portion or end 1012 and a second portion or end 1020. The first portion 1012 is configured with inlets or vents for receiving supply inlet airflow 1013 as well as input exhaust airflow 1014, and the first portion 1012 also includes vents or outlets for outputting exhaust airflow 1015 from the unit 1000. The second portion 1020 is configured (e.g., with manifolds and other components to direct air flow) with outlets for supply outlet airflow 1022 with a portion 1025 being redirected back into the housing 1010 as shown at arrows 1027 to provide counterflow for a fraction of the channel provided for supply inlet airflow 1013 (with exhaust airflow 1014 provided as a cross flow in the other or initial portion of the channel) and then this air is exhausted from the housing portion 1020 at 1028. The input exhaust airflow 1014 may be return air to be exhausted or outdoor air (e.g., from the building space). This approach 1000 improves the efficiency by utilizing a smaller purge airflow 1025, 1027, and it is typically preferred to limiting purge air flow to increase or maintain desirable efficiency.

Referring again to FIG. 4, operation of the cooler 400 is expected to have the cooling process shown in the psychrometric chart 910 of FIG. 9. As shown, line 912 represents the supply air flow while line 916 represents the purge air flow stream. The desiccant side air boundary layer is represented with line 918. The chart shows graphically how the dehumidification driver for the cooler 400 is advantageously utilized to provide a more effective cooler. The cooler 400 may use even a weak desiccant such as CaCl solution to provide significant dehumidification, and this is due in part to the cold temperatures that are achieved with the configuration of the cooler 400 that allow weak desiccants to attain high dehumidification potential.

Figure 10:
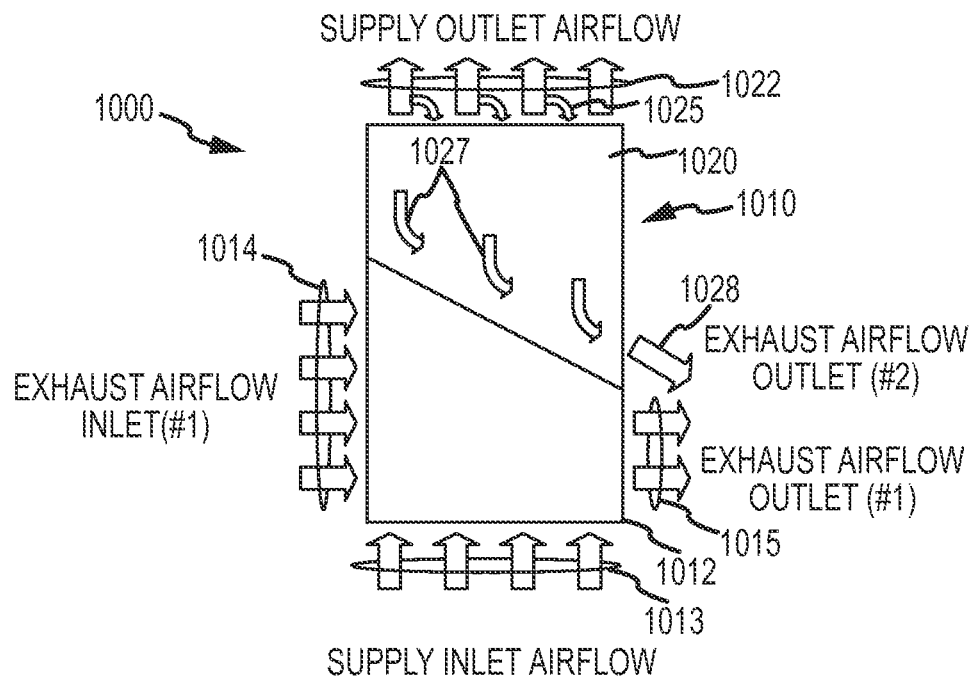
FIG. 10 is a top view of another exemplary heat exchanger illustrating air flows through a plurality of channels or chambers provided by membrane-based assemblies such as those shown in FIGS. 1-3 or other embodiments shown or described herein.
Figure 12:
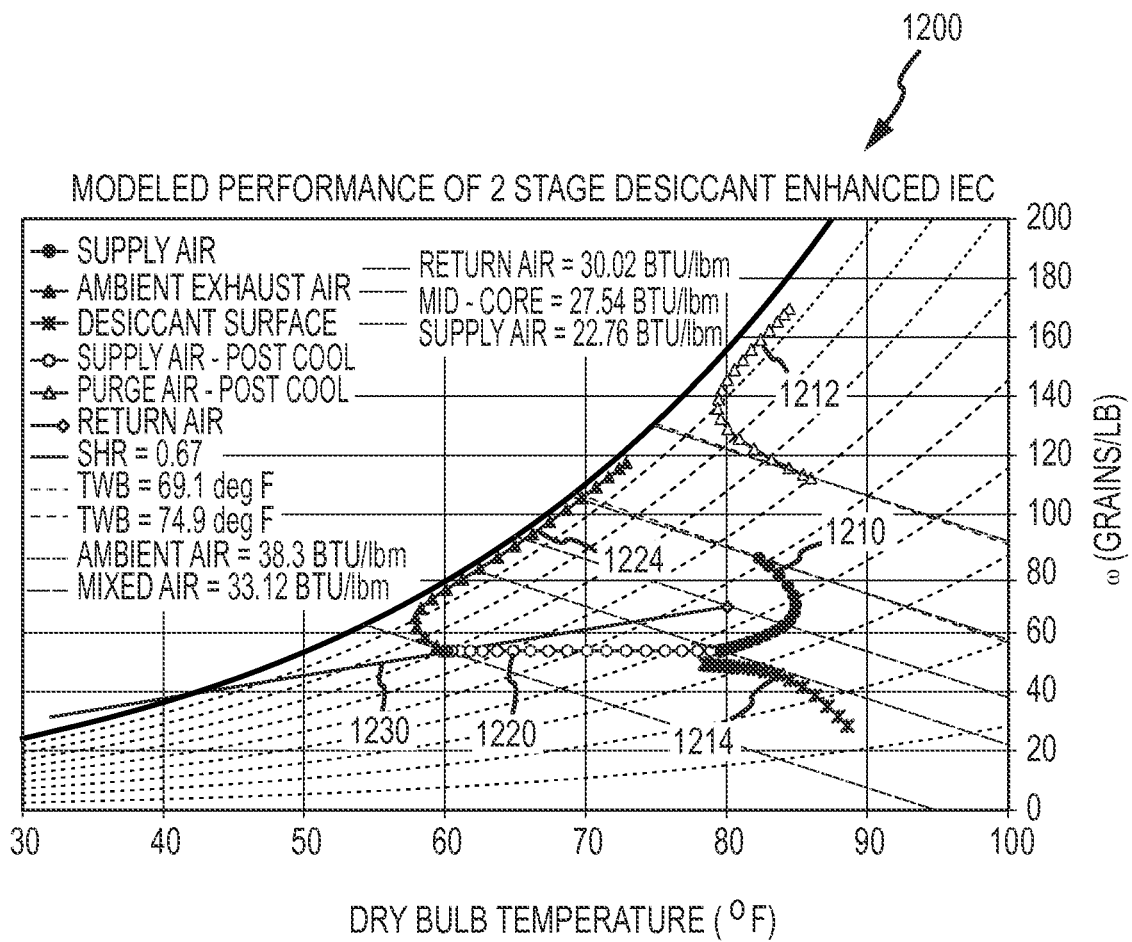
FIG. 12 is a psychrometric chart showing the cooling and dehumidifying process modeled similar to the modeling shown in FIGS. 5A-5B for the configuration of a heat exchanger shown in FIG. 10.

The configuration shown with cooler 1000 of FIG. 10 was modeled to determine the desirability of its performance, and the results are provided in psychrometric chart 1200 of FIG. 12. In the chart 1200, line 1210 represents supply air, line 1212 represents ambient exhaust air, line 1214 represents desiccant side surface temperatures, line 1220 represents the supply air post cooling, line 1224 represents the purge air post cooling, and line 1230 is the sensible heat ratio line (SHR) in which the load on the building follows. So, for example, a building will have 0.67 units of sensible heat and 0.33 units of latent heat added to the space to arrive at the return air condition, which is the middle diamond at 80° F. and about 70 grains/lb, and that point may be considered the return air condition. The first point of line 1210 is the "mixed air" condition, which is a 30/70 mixture of outdoor air and return air. The two-stage approach to cooling provided by cooler 1000 allows the process to be split into two distinct sections of dehumidification plus a post cooling stage (e.g., sensible cooling only stage in which, for example, there is no desiccant layer and dehumidification and only evaporative cooling is provided). The cooler 1000 is, of course, only one example of numerous configurations that may be implemented to provide two or more stage cooling using the membrane containment features described herein, and it shows the possibility of attaining nearly any SHR desired (e.g., in this case, a SHR of about 0.67). In the modeling to provide the chart 1200, a 1 cubic foot core (or mass/heat transfer assembly) was used with 176 SCFM, and a flow ratio of about 0.3 (e.g., 30 percent purge and 70 percent supply air). Also, the return air was at 80° F. and 40 percent relative humidity, ambient air was at 86° F. and 60 percent relative humidity, and the liquid desiccant fed into the assembly was 44 percent LiCl (but other desiccants such as solutions of salt (such as, but not limited to, halide salts) and water that are about 20 to 40 percent salt by weight may be used). The assembly was able to provide 0.5 tons of building cooling with just this 1 cubic foot at about 7 Btu/lb. As can be appreciated from this example and modeling, the use of membranes to contain desiccant and coolant (e.g., to contain liquids) enable indirect evaporative coolers to be produced that are much more compact than prior designs, that are easier to maintain (e.g., have less or no fouling issues), and that are more efficient in producing cooling (e.g., with simultaneous dehumidification and cooling to provide an evaporative cooler that can condition as well as cool process air).

Figure 11:
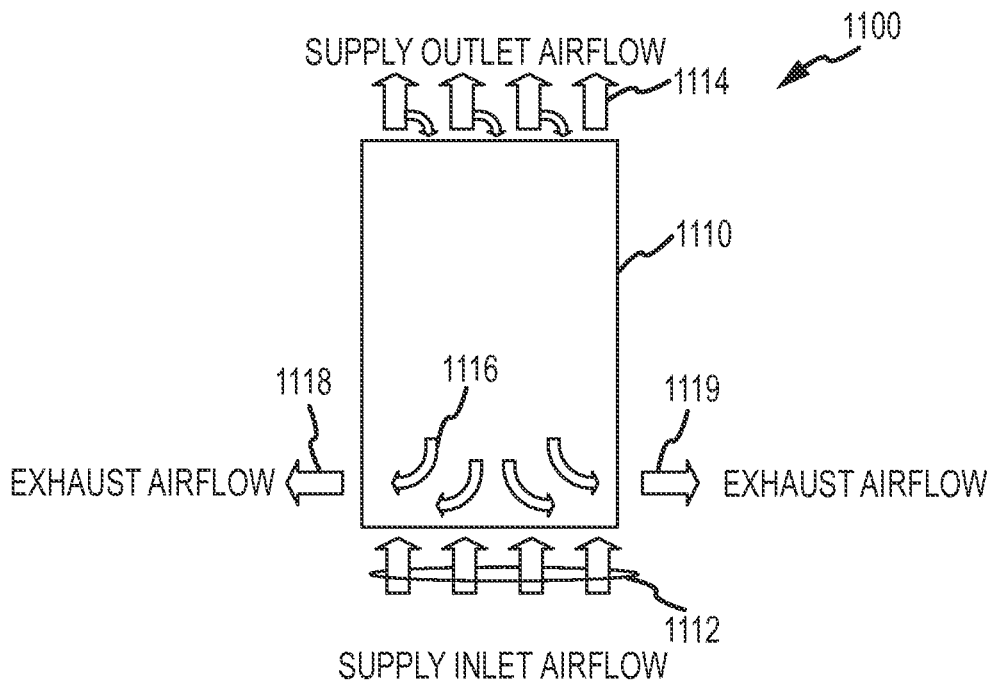
FIG. 11 is a top view of another exemplary heat exchanger similar to those shown in FIGS. 4 and 10 showing a differing unit arrangement with differing exhaust airflows.

FIG. 11 illustrates an evaporative cooler 1100 providing another counterflow arrangement in which the counterflow cooling air (or pre-cooled supply air) is directly opposite in direction but only for a selected length (such as half to 80 or 90 percent or more of the length) of the stacks or flow chambers (e.g., when full counterflow is not required or desired). As shown, the cooler 1100 includes a housing 1110 containing a plurality of stacks or sets of stacks configured as a mass/heat transfer assembly (as discussed above) with alternating flow channels for supply inlet airflow 1112 and for counterflow air (e.g., redirected supply outlet airflow 1114). The housing 1110 includes venting and/or manifolding for directing the supply inlet airflow 1112 (e.g., outdoor make up air and return air) into channels between desiccant containing membranes and to output the cooled and, often, dehumidified supply outlet airflow 1114. The cooler 1100 further includes ducting, manifolding, and the like for redirecting a fraction of the supply outlet airflow back into the housing 1110 to provide cooling counterflow air as shown at 1116 (e.g., into flow channels between coolant containing membranes). The counterflow air 1116 typically does not travel along the entire length of the housing 1110 but is, instead, discharged out a side vent at some point along a channel length (e.g., at a distance about 60 to 80 percent of the length). Such a configuration is useful to tune a cooler 1100 for particular operating environments (e.g., to provide a desired amount of cooling to the supply outlet airflow based on outside air temperatures and humidities and other operating parameters).

Figure 13:
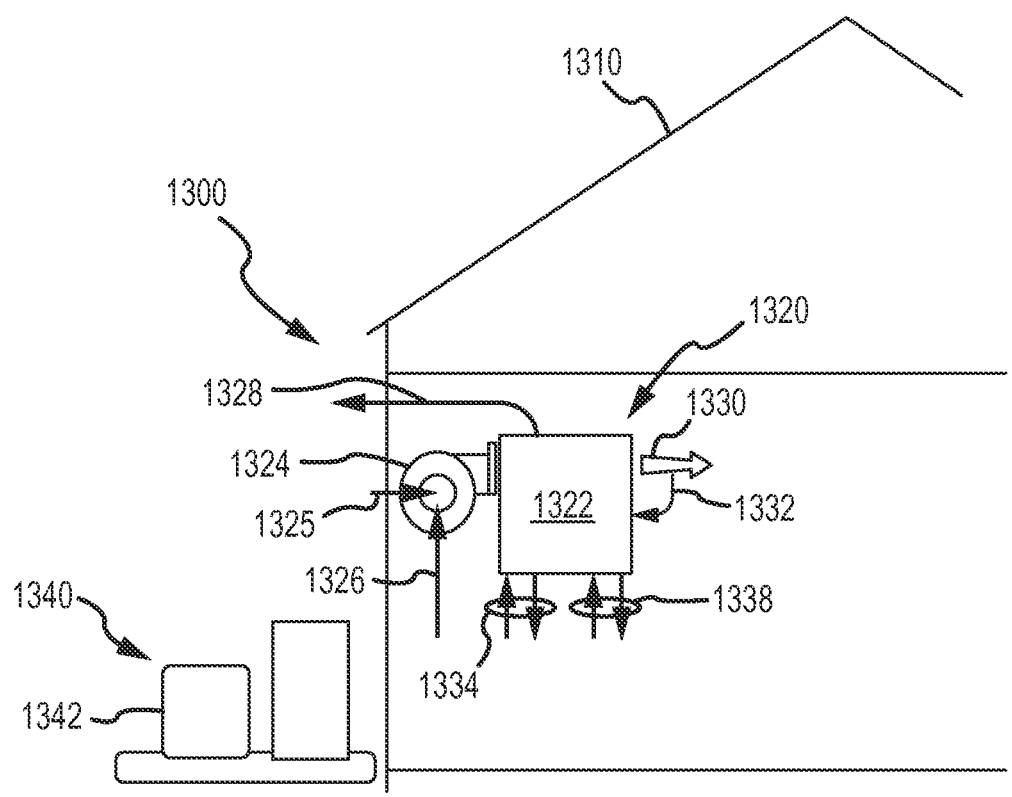
FIG. 13 illustrates a HVAC system using an indirect evaporative cooler to provide conditioned air to a building.

The stack and membrane technology described herein are readily applicable to a number of indirect evaporative cooler designs (with and without use of liquid desiccant for dehumidification) and applications. However, it may be useful to discuss the use of the technology within an air conditioning or HVAC system with the belief that those skilled in the art will readily understand that the technology is useful in many other such systems. FIG. 13 illustrates a simplified air conditioning system 1300 in which the membrane technology may be provided to provide desiccant dehumidification and evaporative cooling to condition air within a building 1310 (e.g., a residential or commercial building or other structure requiring conditioned and cooled air). As shown, the system 1300 includes a cooler 1320 with a housing 1322 that is used to house a membrane stack assembly, such as described above with reference to FIGS. 1-12 and below with reference to FIGS. 15-20. A fan or blower 1324 is provided to draw in outside or make up air 1325 and move return air 1326 from the building 1310. The fan 1324 pushes these two air streams as inlet supply air through the stacks as described above (e.g., adjacent liquid desiccant contained in membrane in embodiments providing dehumidification or adjacent separation walls in embodiments with just evaporative cooling). The cooled (and, typically, conditioned air is output at 1330 as supply to the building 1310 and a portion is returned 1332 as purge or pre-cooled exhaust air that passes on the coolant or evaporative cooling side of the stacks in housing 1322 and then out as exhaust 1328. Coolant is provided in the form of a water supply and drain 1334 to the housing (and through the stack assembly), and liquid desiccant is provided at 1338 as supply and drain. The desiccant 1338 is regenerated with a regenerator system 1340 including, in this example, a desiccant boiler 1342.

The desiccant enhanced indirect evaporative cooler (DE-IDEC) 1320 is the portion of the system 1300 that takes strong desiccant and water to provide cooling to building 1310. The system 1300 provides both sensible and latent cooling to building 1310 on demand and in proportion to the demand, e.g., the system 1300 can provide cooling in the form of 100 percent sensible, 100 percent latent, or any combination thereof. The DE-IDEC 1320 uses some portion of outdoor air 1325 with equal exhaust air 1328 to reject the heat load outside of the building 1310. The DE-IDEC 1320 itself can sit inside or outside of the building envelope because it has no wet surfaces and the liquid streams 1334, 1338 are closed loop. This makes system 1300 acceptable for indoor use and for placement of cooler 1320 inside the building 1310. The water source (or coolant source, not shown) for water or coolant 1334 is not required to be potable, and the system 1300 is compact enough to be acceptable by building managers. The electricity usage is much less than that of typical vapor compression systems or units (e.g., less than 0.2 kW/ton peak compared with 1.2 kW/ton typical for conventional compression units).

The regenerator 1340 is another of the significant components to the operation of the system 1300. This unit 1340 takes the weakened desiccant from the DE-IDEC 1320 and applies heat with boiler 1342 (see list of heat sources below) to drive off the moisture contained in the desiccant 1338. The result is a desiccant 1338 that has higher salt concentration and can be re-used by the DE-IDEC 1320 (e.g., in the membrane contained/defined flow channels adjacent to supply inlet air 1325, 1326). A list of heat sources suitable for desiccant regeneration may include: (a) gas or other fossil fuel; (b) solar heat; (c) waste heat from any waste heat stream such as combine heat and power plant; and (d) waste heat from a condenser unit originating from a vapor compression cycle.

Figure 14:
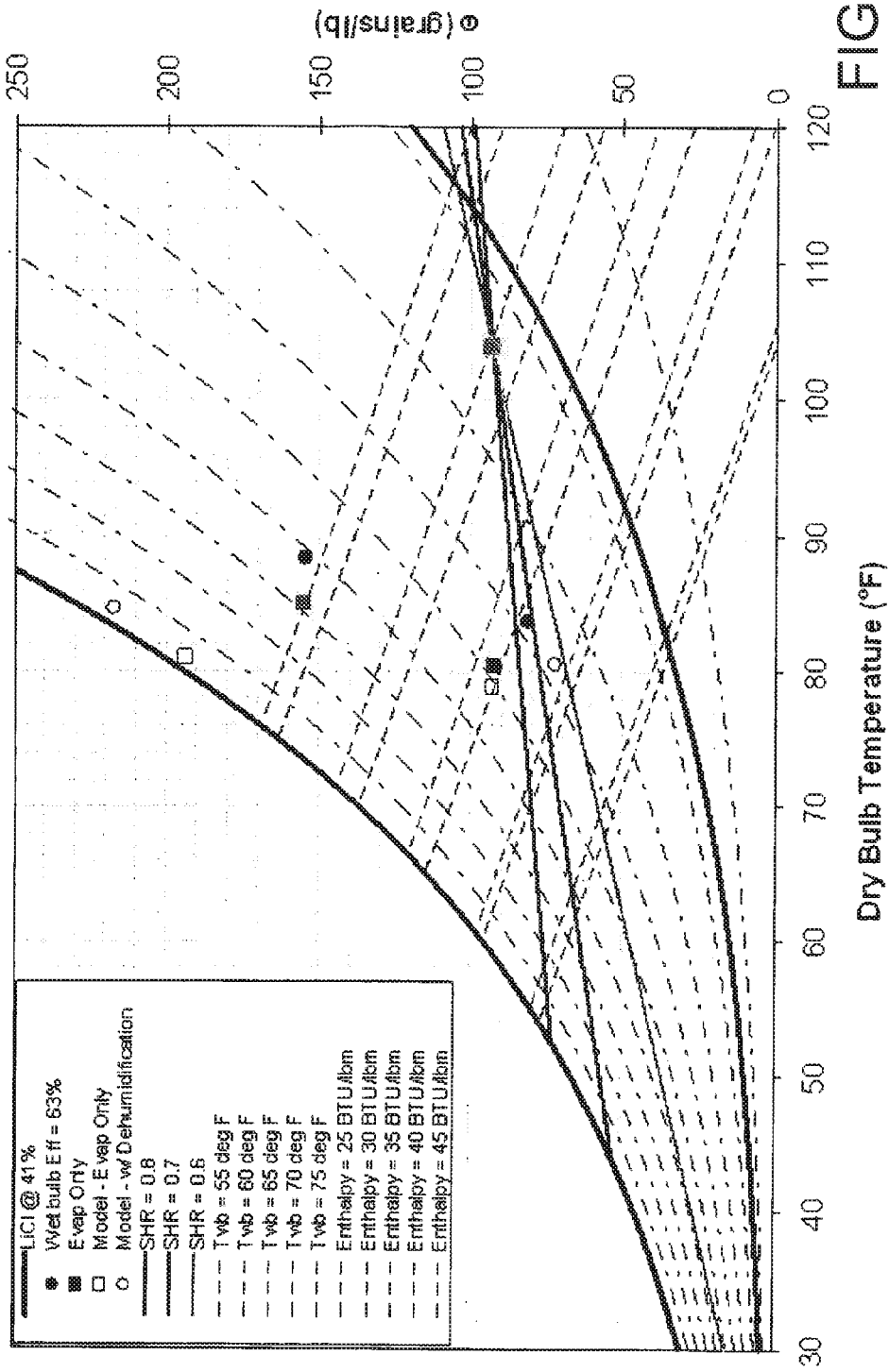
FIG. 14 is a psychrometric chart providing results of one test of a prototype fabricated similar to the embodiment of FIG. 4 with the stack assembly of FIG. 2.

The inventors performed a test of a prototype fabricated similar to the cooler shown in FIG. 4 with a stack assembly such as shown in FIG. 2. FIG. 14 provides results of the testing for this proof of concept prototype that was constructed and tested at 104° F. and 93 grains/lb inlet air. The prototype was tested with and without desiccant flow, but with membranes provided to define liquid desiccant flow channels. Without the desiccant flow, the indirect evaporative cooler had a wet-bulb effectiveness of 73%. When desiccant was turned on (with 41% LiCl solution as the desiccant), the effectiveness was 63% and had 12 grains/lb of dehumidification. This resulted in a sensible heat ratio of 0.73. The prototype did not reach model expectations as explained above, and this was likely due to prototype defects creating non-uniform air, water, and desiccant flow distribution.

It was recognized by the inventors that use of the membrane to contain the liquid desiccant and separate it from air flow is desirable in most if not all mass transfer/heat exchanger assemblies. For example, with reference to the indirect evaporative cooler 100 of FIG. 1, the membrane 112 is used to block flow of the liquid desiccant 124 into the inlet air stream 120 while concurrently allowing water molecules 130 to flow from the inlet air stream 120 to the desiccant 124 to dehumidify and cool the inlet or process air 120.

However, the inventors further determined that the second membrane 118 is not needed to practice many aspects of the evaporative coolers described herein. Particularly, an indirect evaporative cooler may be provided in which each stack only includes a single water-permeable membrane (such as membrane 112) while coolant flow is provided on the opposite side of a separation wall (such as wall 114) through other techniques such as by providing a flocking sheet or layer (or wicking element) on the separation wall 114 opposite the side of the wall defining the liquid desiccant flow chamber/channel. The stack may be arranged vertically in such embodiments of the evaporative cooler to make use of gravity to encourage coolant flow from the top to the bottom of the stack in the wicking layer. In other cases, though, the wicking layer or flocking may be provided on a top or bottom side of a separation wall (a horizontal stack arrangement) with capillary action (or other mechanisms) used to obtain a desired coolant flow through the stack.

Figure 15:
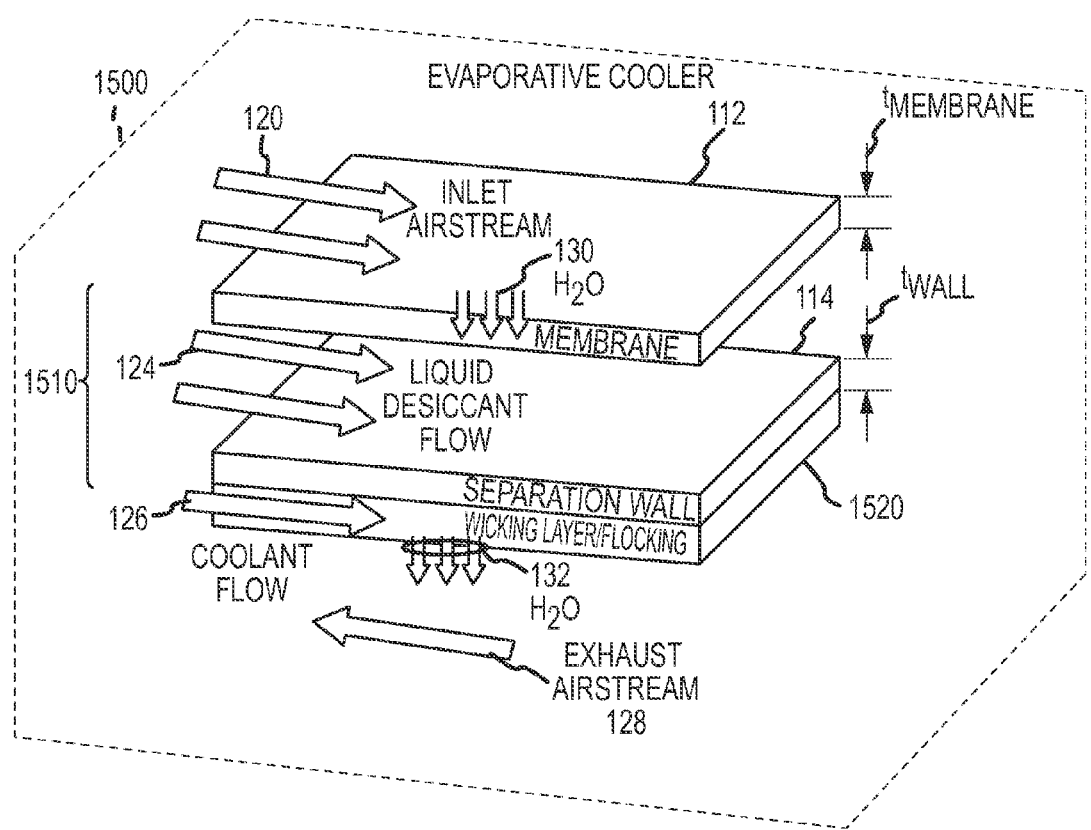
FIG. 15 illustrates in schematic form an evaporative cooler or heat exchanger similar to that shown in FIG. 1 including another representative permeable membrane stack or assembly.

FIG. 15 schematically illustrates an indirect evaporative cooler (or mass/heat exchanger) 1500, which may be used in place of the evaporative cooler 100 shown in FIG. 1. The cooler 1500 may be thought of as a modification of the cooler 100 with retained components or elements having like numbers in FIGS. 1 and 15. Particularly, the evaporative cooler 1500 is useful for providing concurrent dehumidifying and cooling of a process or inlet air stream 120. This is achieved with one or more mass/heat transfer stacks 1510. As shown, the inlet air stream 120 is directed to flow in a chamber or channel defined in part by a sheet or layer of a membrane 112, which may take the form described above for stack 110. Liquid desiccant 124 flows in an adjacent chamber or channel on the other side of the membrane 112. The chamber for the desiccant 124 flow is also defined by a separation wall 114, which, as described above, is impermeable to fluid flow so as to contain the liquid desiccant 124. The chamber for air stream 120 is also defined by an opposing membrane (not shown) that is used to contain another flow of liquid desiccant (e.g., a membrane of another stack configured similar to stack 1510).

As with cooler 100 of FIG. 1, the evaporative cooler 1500 is configured for counter-flow of the pre-cooled exhaust air stream 128 (relative to the inlet air stream 120). In contrast to the cooler 100, though, the exhaust air stream 128 flows in a channel or chamber defined on one side by a wicking layer or flocking element 1520 and on another side by an upper element of another stack (not shown, but may be another wicking layer or a membrane).

Significantly, the wicking layer or flocking 1520 is attached to a side of the separation wall 114 and acts to wick or guide flow of a volume of coolant 126 in the stack 1510. In other words, the second membrane 118 of cooler 100 is removed as it is not needed to define a coolant flow channel/chamber. Instead, the wicking layer 1520 may be thought of as defining a channel or flow path for the coolant 126, which is shown to be in counter to the exhaust air stream 128. The air in stream 128 is in contact with the wicking layer 1520 and the coolant 126.

The coolant 126 may be a flow of water or the like, and heat is transferred from the liquid desiccant 124 to the coolant 126 through the separation wall 114. The coolant 126 flowing or being wicked by wicking layer 1520 is cooled as heat and mass (e.g., water or other moisture 132) is transferred to the exhaust air stream 128 directly rather than through a membrane as in cooler 100 of FIG. 1. Heat transfer is not shown in FIG. 15 but generally heat is flowing through the membrane 112 to the liquid desiccant 124 via water 130 and then through the separation wall 114 from the liquid desiccant 124 to the coolant 126, and then from the coolant 126 to the exhaust air stream 128.

Capillary action may support flow of coolant 126 in wicking layer 1520 when the stack 1510 is arranged in a horizontal configuration, but some embodiments will position the stack 1510 including the separation wall 114 and attached/contacting wicking layer 1520 to be vertical such that gravity facilitated coolant flow 126 from the top to the bottom of the evaporative cooler 1500. As with the stack 110, the stack 1510 may be provided in multi-stack assemblies/coolers such as the cooler 210 with the stack 1510 being used to provide, or in place of, stack 230 (and/or other stacks 212, 240). In such an arrangement, the flow channel for the exhaust air stream 128 typically would be defined by facing but spaced apart wicking layers 1520 on separation walls 114 (e.g., spaced apart, flocked surfaces of two separation walls).

A variety of flocking materials may be used to implement the wicking layer 1520 on separation wall 114. The wicking layer 1520 acts to spread out or disperse the flowing coolant 126, e.g., to avoid rivulets of flowing coolant, which enhances heat transfer from the wall 114 and also mass/heat transfer to exhaust air stream 128 in the adjacent flow chamber/channel of stack 1510. The flocking material of the wicking layer 1520 also acts to impede gravity to get a slower flow in vertical configurations. The thickness of the layer 1520 may vary but in some cases may be approximately 0.015 inches thick while other useful implementations may use flocking in the range of 0.005 to 0.05 inches in thickness. Exemplary flocking for the wicking layer 1520 include: (a) knitted nylon fabric; (b) polypropylene woven or non-woven fabric; and (c) adhesive-backed flocking fibers (typically polyester or polypropylene), e.g., the layer 1520 may include fibers standing up along (or arranged transverse to) planar surface of wall 114 and may have lengths of 0.01 to 0.05 inches or more.

While a wide variety of materials may be used in layer 1520, there are a number of wicking or flocking characteristics that may be desirable for operation of the cooler 1500. The wicking surface of layer 1520 provides a method or mechanism to evenly spread either desiccant or water (as shown in FIG. 15) over a surface (e.g., surface or side of wall 114). The wicking surface impedes the forces of gravity on the flowing liquid to slow the flow rate down to a range of about 5 to 50 inches per minute, with some useful implementations using a flow of about 20 in/min. The flock also enables low total flow rate of water to be applied. The total flow rate of water or other coolant enables flow rates that are between 1.2 to 4.0 times the evaporation rate of water (or other coolant). Typically, this flow would be set based on water quality that is being used and would be 1.2 to 2 times the evaporation rate. In another embodiment, the flow rate of water may be set higher than in the above examples by use of re-circulating the water. In this case, the water flow rate may typically be 4 times evaporation rate and could be in the range of 3-10 times the coolant evaporation rate.

As shown in FIG. 15, indirect evaporative cooler 1500 provides a channel pair where a first airflow 120 is cooled and dehumidified by water absorption 130 through the vapor permeable membrane 112 to the liquid desiccant 124. The second airflow (in the second channel of the channel pair provided by stack 1510) 128 removes heat from the first airflow 120 by the evaporation of water 132. The water/coolant 132 is contained within a flocked or wicked surface (which provides layer of flocking 1520) on wall 114 opposite the flow channel for liquid desiccant 124. The evaporation 132 of water/coolant 132 from the flocked or wicked surface of wall 114 removes heat from the first airflow 120 by heat conduction and convection through the membrane-desiccant-separation wall assembly or stack 1510.

Generally, the cooling process or method provided by operation of an evaporative cooler (such as cooler 1500) involves receiving an input or process air stream. This process air stream undergoes dehumidification in a first section or portion of the evaporative cooler (i.e., the desiccant-contained dehumidification section), and this is followed by sensible cooling in a second section (i.e., indirect evaporative cooling section). As shown herein, though, dehumidification and sensible cooling may occur in a single or integral section or portion of the cooler to occur concurrently. The process air is then delivered to a work space or indoor area for use in cooling a space while the purge/exhaust air is used to remove heat from the coolant and is output/discharged from the cooler.

In some cases, it may be desirable for an indirect evaporative cooler to be provided with a humidification section. This would allow the above cooling method/process to be modified to include a step after sensible cooling in which the process air is humidified adiabatically to further drop the temperature of the air prior to output from the indirect evaporative cooler into a work space or building space. In some embodiments, humidification is provided by having the sensibly cooled air flowing in channels/chambers with one or both sidewalls defined by vapor permeable membranes. Particularly, the indirect section (indirect evaporative cooler) may be followed by a section that provides direct evaporative cooling, which also humidifies. This acts to further reduce the temperature of the outlet stream to provide higher sensible cooling, but such higher cooling comes at the expense of providing less latent cooling (dehumidification). Such additional cooling is shown with line 2025 in the psychrometric chart 2200 of FIG. 22, where the air is moved from an air state "2" to an air state "2.5" (with this chart 2000 explained in more detail in the following description). The particular methods or mechanisms used to provide direct evaporative cooling may be performed in many ways to practice such a cooler.

Figure 16:
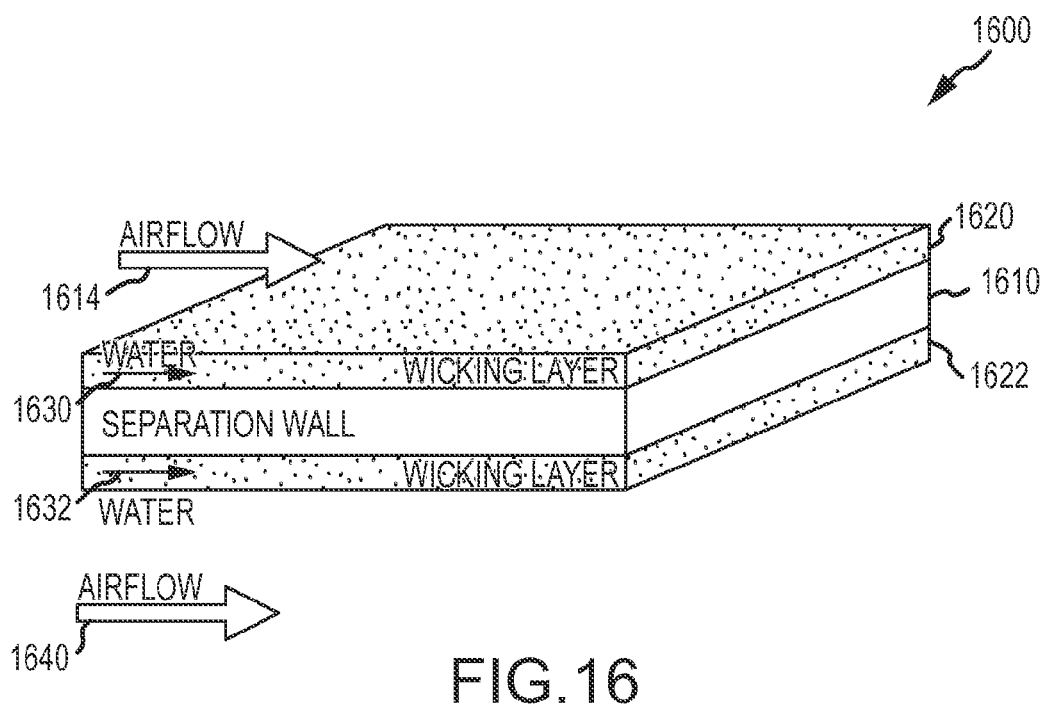
FIGS. 16 and 17 illustrate in schematic form two humidification sections (or portions of a stack that may be provided in such a section), each of which makes use of a wicking layers wetted with water or other humidification fluids/sources.

In other cases, though, a flocked surface may be used in the humidification section. For example, FIG. 16 illustrates a humidification section (or portion of such a stack/assembly) 1600 in which a separator or separation wall 1610 is provided to define sidewalls of two adjacent flow channels for process air 1614 (i.e., air that has been sensibly cooled in an upstream section of an evaporative cooler). Both sides of the wall 1610 have been covered with flocking or wicking material to provide a top wicking layer/element 1620 and a bottom wicking layer/element 1622 that are wetted (such as with water) to provide a moisture source or coolant 1630, 1632 for humidification as the air 1614 flows over the wetted surfaces of layer 1620 and to provide a heat/mass transfer to exhaust air stream 1640 (but the bottom flocking surface/layer 1622 may be omitted in some embodiments). Note, the air streams 1614 and 1640 (and 1710, 1740 below) may both be supply air.

Figure 17:
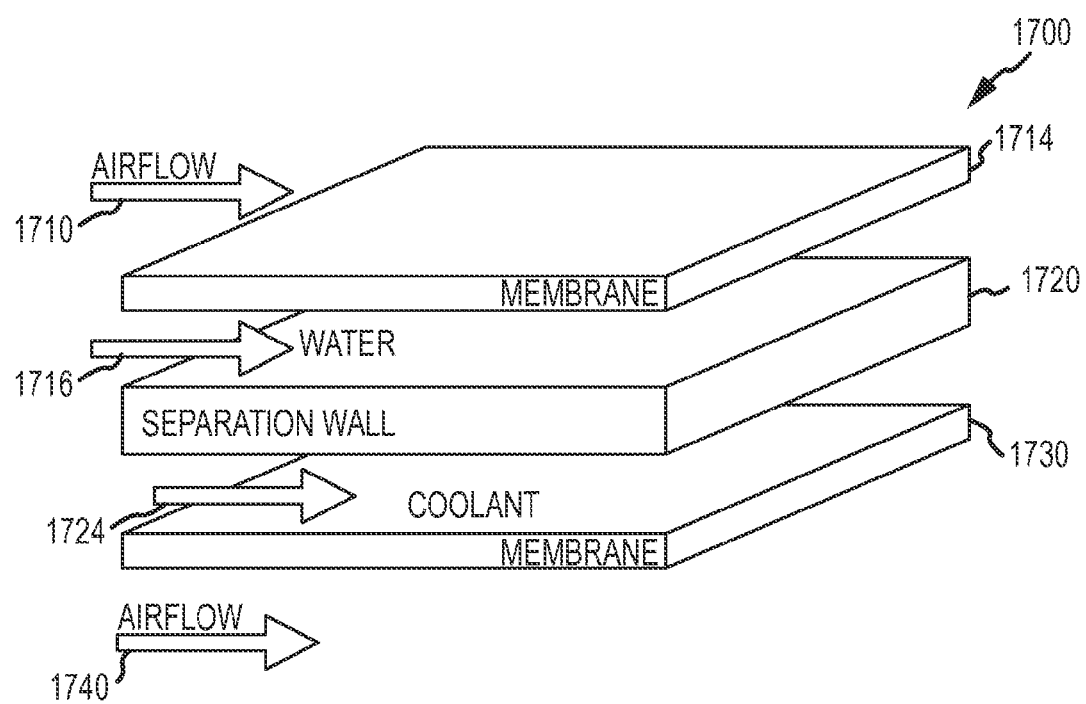

FIG. 17 illustrates another humidification section 1700 that may be used in an indirect evaporative cooler (downstream from the sensible cooling section). In the humidification section 1700, a sensibly cooled air stream 1710 flows over a vapor permeable membrane 1714 separating the airflow 1710 (or the channel it flows within) from a flow of water or the like 1716 (or the channel in which it flows). The water flow channel or humidification source is defined on the other side by a first side/surface of a separation wall 1720. The other side of the separation wall 1720 along with a vapor permeable membrane 1730 defines a channel or chamber for flow of a coolant 1724. The humidification section 1700 further includes another or second channel or chamber in which exhaust air 1740 flows along the other side of the vapor permeable membrane 1730 and to remove heat from the evaporative cooler containing humidification section 1700.

At this point, it may be useful to describe a two-stage indirect evaporative cooler 1800 with reference to FIGS. 18-20. These figures show graphically how the cooler 1800 works on three levels: (1) FIG. 18 illustrates a heat exchange schematic showing general air, water, and desiccant flows; (2) FIG. 19 illustrates a channel pair graphic or schematic that shows an air channel pair and location of membrane and wicked water surface in the first stage and in the second stage heat and mass exchangers; and (3) FIG. 20 provides a psychrometric chart 2000 showing each air state in the cooler 1800.

FIG. 18 schematically illustrates a two-stage indirect evaporative cooler 1800 and its air flow pattern during operation. Air states are numbered in FIG. 18 and these air state numbers are repeated in FIGS. 19 and 20 (as our reference numerals to components shown in both FIGS. 18 and 19). In this discussion, air streams may be referred to or described as moving from one state to the next such as air stream "1" to "1.5" is the stream of air moving from a first air state to a second air state as the air is dehumidified.

The cooler 1800 is configured in two distinct stages or assemblies 1810 and 1850 providing a first-stage humidifier and a second-stage indirect evaporative cooler. As shown, the humidifier 1810 is made up of a number of stacks 1814 (as discussed above and shown in FIG. 19). Each stack 1814 defines a flow channel or chamber for inlet or process air 1820 to flow through the dehumidifier 1810 and be output to the second stage 1850 as dehumidified air 1822. The stacks 1814 also define flow paths for and act to contain liquid desiccant 1816 in the dehumidifier 1810 (e.g., LiCl, CaCl or the like at 35 to 40 percent by weight at a flow rate of about 0.34 gallons/minute per space cooling ton). Further each stack 1814 defines, with a pair of spaced apart wicking layers or surfaces on separation walls wicking or flowing water/coolant 1818, flow channels or pathways for exhaust air 1826 (input at air state "3") to flow through the dehumidifier and remove heat from the liquid desiccant 1816 and be output at 1828 (at air state "4").

The first-stage dehumidifier 1810 is a cross-flow heat and mass exchanger between two air streams 1820/1822 and 1826/1828. Desiccant 1816 and water 1818 flow vertically and are gravity driven. The liquid desiccant 1816 is contained by a polypropylene microporous membrane or other vapor permeable membrane (e.g., a Z-series from Celgard LLC or another distributor/manufacturer). In some implementations of cooler 1800, nozzles may be used to spray a high water flow rate (water 1818) that creates a two-phase flow of water and outdoor air in air stream 1826/1828 (air states "3" to "4"). The dehumidifier 1810 may be designed to provide a low water flow rate that is spread by wicked surfaces in contact with the air stream 1826/1828. In some embodiments, a waterside membrane may be used for controlling biological growth because it creates a barrier that blocks organisms from implanting onto wet surfaces.

The second-stage or indirect evaporative cooler 1850 is formed with an assembly or number of stacks 1854 (as shown in FIG. 19). Each stack 1854 defines a flow path or channel for dehumidified air 1822 to flow through the evaporative cooler 1850 to be output as cooled/dehumidified supply air 1860. Further, the stacks 1854 and/or manifolds or other portions of evaporative cooler 1850 define flow paths/channels for a portion of the supply air 1862 to be returned to flow through the cooler 1850 and be exhausted at 1866 after removing heat from the air stream 1822/1860. Further, the stacks 1854 provide flow paths or channels for coolant (e.g., water) 1858 such as via gravity flow in wicking layers on separation walls. The second stage 1850 is designed as a counterflow indirect evaporative cooler. In testing of some embodiments, the stage 1850 has a wet bulb effectiveness measured at 120 to 128 percent at the design mass flow rate. For both stages 1810, 1850 the water 1818, 1858 was gravity driven and provided at a low flow rate distributed across the heat transfer surfaces of stacks 1814, 1854 by a wicking material or thickness of flocking.

Top views of exemplary implementations of the stacks 1814 and 1854 of the stages 1810, 1850 are shown in FIG. 19 (with repeated components and flows labeled with like reference numbers). As shown, the first stage stack 1814 provides a pair of air flow channels: a first channel/chamber for ventilation or input air 1820 (that typically includes a volume of return air 1821 from the cooled space) and a second channel/chamber for exhaust air 1826 flowing into the page (cross flow in this example). The first channel is defined by a first wall assembly formed of a separation wall 1960 (e.g., a plastic or metal sheet) and a vapor permeable membrane 1962, which faces the air stream 1820, 1821. A flow of liquid desiccant 1816 is contained within the wall assembly provided by separator 1960 and membrane 1962. The first channel is further defined by a second wall assembly formed of a separation wall 1966 and another vapor permeable membrane 1964. Again, the membrane 1964 faces or is exposed to the air stream 1820, 1821 and a flow of liquid desiccant 1816 is provided and contained between a side/surface of separation wall 1966 and the membrane 1964.

The second or paired air flow channel of first stage stack 1814 is defined by the other/opposite side of the separation wall 1966 upon which a wicking layer 1970 is provided. The wicking layer 1970 wicks coolant/water that is directly in contact with flowing exhaust air to allow heat to be released from liquid desiccant 1816 and air stream 1820, 1821. The second air flow channel is further defined by another separation wall 1974 (which may be a top wall of a next stack), and another wicking layer 1927 of flocking or wicking material is provided on the surface/side of the separation wall 1974 facing the wicking layer 1970. Coolant such as water is wicked or gravity fed through the wicking layer 1972 as the exhaust air flows through the stack 1814.

With regard to the second stage stack 1854 of the indirect evaporative cooler 1850, a flow channel is provided for air stream 1822. This channel is provided by a side/surface of a separation wall 1980 and a spaced apart second separation wall 1982. A second flow channel is provided in stack 1854 into which a portion 1862 of the supply air 1860 is returned into the stack 1854 to remove heat and be exhausted at 1866. A second air flow channel/chamber is defined by the opposite side of separation wall 1982, which is covered with flocking/wicking material to provide a wicking layer 1984. Water or coolant is gravity fed through this layer 1984 during use of the stack 1854 in a cooler assembly. The second flow channel for air stream 1862 is further defined by a second wicking layer 1988 provided on a facing side or surface of an additional separation wall 1990. As discussed throughout, numerous first and second stage stacks 1814, 1854 would be assembled or stacked upon each other to form a two-stage cooler 1800.

FIG. 20 is a psychrometric chart 2000 illustrating the thermodynamics of the cooling processes provided by operation of the cooler 1800. The return air state is shown at 2060 while the state of the liquid desiccant is provided with line 2050 in the chart 2000. Line 2010 shows the thermodynamics as the incoming or supply air moves from air state "1" to air state "1.5" (as shown in FIGS. 18 and 19) and is dehumidified using the liquid desiccant contained in the vapor permeable membranes in the first stage dehumidifier 1810. Line 2020 illustrates thermodynamics of the dehumidified air passes through the second stage indirect evaporative cooler 1850 and moves from air state "1.5" to air state "2" and is subject to sensible cooling. Line 2030 shows the thermodynamic properties of the return air 1862 that is passed back through the second-stage cooler 1850 and is then output as purge or exhaust air 1866. Line 2040 illustrates thermodynamic properties of exhaust air stream 1826 to 1828 (e.g., outside air) as it passes through the first-stage dehumidifier 1810. As shown in the chart 1800, the air to be supplied to a building space was dehumidified and was also reduced from an original temperature between 80 and 85° F. to about 60° F., which is useful for cooling many residential and commercial spaces.

The cooler 1800 may be modified by adding a direct evaporative section or stage as shown in FIG. 21. In the cooler of FIG. 21, the cooled supply air 1860 from the second stage 1854 is output to the direct evaporative stage 1999 where the air 1860 undergoes humidification and further cooling before being discharged at 1997 in air state "2.5." As shown with the psychrometric chart 2200 of FIG. 22, direct evaporative cooling may be provided as shown with line 2025 to further reduce the temperature of the outlet air stream (but, as shown, the air stream is also humidified) as the air moves from air state "2" to air state "2.5." The direct evaporative stage may be integrated into the second stage device 1854 or provides as a separate device (e.g., with reference to FIG. 18, a separate heat and mass exchanger in the cooler 1800 downstream of evaporative cooler 1850 or be integrated into evaporative cooler 1850).

As shown, the supply air 1860 flows in channels defined by separation walls 1991, 1993, and 1995 with wicking material or flocked surfaces 1992, 1994 facing into each channel. In this way, a water may be caused to flow next to the air 1860 to provide humidification to the output supply air 1997 (cooled and humidified to air state "2.5" as shown in FIG. 22). Air 1997 is colder than air 1860 from the second state 1854, and less energy is required to provide a desired level of cooling.

The cooler 1800 may be assembled and implemented in a variety of ways to practice the cooling methods and techniques described herein, but it may be useful to describe one tested assembly or cooler. In the first-stage, flutes were created by extrusion to form the coolant airstream 1826 to 1828 (state "3" to state "4"). Water 1818 was distributed via flow nozzles at the top of the dehumidifier 1810 (e.g., in the airstream 1826 plenum) and mixed with airstream 1826 to 1828, which ran vertically downward. Some water evaporated as it traveled through the dehumidifier 1810, but most was collected at the bottom of the airstream 1828 plenum. Louvers in this plenum were used to separate the water droplets from the airstream. Because this design did not have a mechanism to hold up the water internal to the flutes (e.g., wicked surfaces), this configuration uses a water flow rate that is significantly higher than the water evaporation rate. Thus, a water reservoir and pump were used to return the water from the collection sump to the top flow nozzles.

The unbacked vapor permeable membrane was welded to the flutes/extrusions. A liquid manifold distributed desiccant to the space between the membrane and the flutes/extrusions. Air gaps on airstream 1820 to 1822 (air state "1" to air state "1.5") were maintained by strips of spacers with the extruded flutes oriented parallel to the airflow. The design also incorporated spacers that mix the airstream to enhance heat and mass transfer. Flutes were used to form the channels for airstream 1822 to 1860 (air state "1.5" to air state "2"). A nylon wick was applied to the outer walls of the separation wall/plastic sheets. These subassemblies were then stacked with spacers between each to form the channels for air flow 1862 to 1866 (air state "2" to air state "5"). A low flow of water 1858 was distributed into the second-stage channels from the top. The nylon wick had sufficient water upkeep to allow this flow rate to be marginally above the water evaporation rate. Thus, a solenoid valve controlling domestic cold water may be used to distribute water. Purge water was collected at the bottom of the plenum of air stream 1866, at which point it was directed to a drain.

Wicked surfaces provide a number of advantages for the indirect evaporative coolers described herein. The wicking ensures that the walls are fully wetted and that there is no lost evaporation area. The water feed rate can be held to a factor of 1.25 to 2 times that of the evaporation rate. This technique allows for "once-through" water use. The water that drains off the heat and mass exchanger is concentrated with minerals and can then be drained away. A sump and pumping system are not required, which improves energy performance and eliminates sump-borne biological growth. A simple controller can periodically use fresh (low concentration) water to rinse the heat and mass exchanger (such as cooler 1800) and clear any built-up minerals. Air streams 1822 to 1860 and 1862 to 1866 are in counterflow in the second-stage 1850. A sensitivity analysis showed that the cooling effectiveness could be reduced by as much as 20 percent if proper counterflow was not achieved. Air stream 1822 to 1860 flowed straight, through extruded flutes, but airstream 1862 to 1866 used a 90-degree turn before exiting the second stage 1850. Computational fluid dynamics software may be used design an air restrictor to ensure proper counterflow of air stream 1862 to 1866.

Likewise, the stacks including the membranes and wicking material may be formed in a variety of ways to implement a mass and heat exchanger of the present description (such as cooler 1800). The construction of one prototype revolved around laminated layers of polyethylene terephthalate (PET) plastic that were adhered with layers of acrylic pressure-sensitive adhesive. Although this assembly method may not easily be scaled to high-volume manufacturing, the achievable geometries are nearly ideal and, therefore, appropriate for prototypes. This enabled the inventors to create a prototype with parallel plate geometry and to include airside turbulators to enhance heat and mass transfer on airstreams. Another prototype was built using layers of extruded polypropylene (PP). It is likely that formed aluminum sheets may be used to create a parallel plate structure to implement a cooler described herein. For example, the aluminum may be corrugated to form a wavy flow channel, which would increase heat transfer by the waviness of the channel (which promotes mixing of the air stream and impingement of the air into the separator plate wall) and also act to reinforce the structure by giving the plates increased rigidity. Such an arrangement may work better in the second stage where there is no desiccant (since the desiccant may corrode the aluminum).

For the first-stage 1810, the laminated layers enabled the use of wicked surfaces in the air stream 1826 to 1828 channels. For the spacer, an off-the-shelf expanded aluminum grating used, and the spacer was used in channels for air stream 1820 to 1822 and air stream 1826 to 1828. The design of the stacks such as stack 1814 used expanded polypropylene hydrophobic membrane from backed with a nonwoven polypropylene fabric to add strength. The backing reduces vapor diffusion through the membrane but increases tear resistance. The backing was oriented to the airside gap, where tears can originate from abrasion by foreign objects or the aluminum spacer. A desiccant manifold was developed that used laminated layers of plastic and adhesive to effectively and evenly distribute liquid desiccant behind the membrane. The second stage 1850 used laminated construction but, with minimal spacers to create laminar flow, used parallel plate air channels. The design used strips as airflow spacers and wicked surfaces on the wet side of the heat and mass exchanger 1800.

With the above discussion in mind, it will be understood that controlling operation of IECs such as the DEVAP air conditioners described above may present a complex challenge and one for which mere application of prior controllers would not be practical. The following discussion teaches techniques for controlling air conditioner or cooling systems that include one or more IEC to cool and/or condition air provided to a space (e.g., a living space such as an office building or a residence).

It was determined by the inventors that a method for controlling an IEC, such as a DEVAP air conditioner, may be provided that is based on processing a set of variables and issuing a set of control instructions or signals to components of a system including the IEC. Typically, these variables are each measurable operating parameters or each have values that can be calculated or determined by the controller using measurable operating parameters.

In particular, the control methods and system use the following set of variables/operating parameters for controlling a DEVAP air conditioner (or the system containing this IEC): (a) supply air flow rate (labeled $m_{SA}$ or m_SA); (b) first stage exhaust air fraction ($EAF_1$), which may be calculated by dividing the exhaust air flow rate in the first stage by the inlet air flow rate; (c) second stage exhaust air fraction (EAF2), which may be calculated by dividing the exhaust air flow rate in the second stage by the inlet air flow rate; (d) liquid desiccant flow rate ($m_{LD}$) or m_LD); and (e) liquid desiccant concentration (CLD or C_LD), which can be controlled by cycling the regenerator on and off. These parameters and variables have been discussed and illustrated schematically above with reference to FIGS. 18-22.

In general, the control methods described use a combination of feedback controls for components of the IEC-based cooling system and fixed algorithms (or control routines/algorithms) involving the above (and other) variables/operating parameters, that are run or used by a controller (which then generates and communicates the feedback control instructions or signals). In other words, the controller may implement the fixed algorithms with computer code or software programs executed by a processor/computing device functioning as the controller in the cooling system. This description presents two control methods that may be implanted in a cooling system to handle the following two scenarios: (1) temperature sensors only used to gather operating variable or parameter information for the control algorithms and (2) temperature and humidity sensors used to gather operating variable or parameter information for the control algorithms.

Prior to examining these two exemplary control methods, it may be useful to describe generally a cooling or air conditioning system that may be adapted to implement either of these control methods as this will clarify where sensors may be provided and where and/or how the cooling system may be controlled to achieve the desired outputs for a cooled/conditioned space using an IEC. FIG. 23 illustrates a cooling system 2300 that is operable to cool and condition air (or product air) 2322 provided to a space or volume 2302, such as a residence, an office building, a warehouse, a retail store, and the like.

To this end, the cooling system includes an indirect evaporative cooler (IEC) 2320, such as those described herein or other configurations for IECs, that is operated to provide the cooled/condition air 2322 to the space 2302. Significantly, a controller 2310 is provided to control operations of the IEC 2320 via control over operations of other components of the cooling system 2300 and by implementing one of the control methods taught by the inventors. The controller 2310 typically will include a processor or take the form of a computing or similar electronic device that is adapted to execute software or code on computer readable media to perform the control methods including receiving sensor-collected data or information including operating parameters for the cooling system 2300, processing this collected data using control routines or algorithms along with setting or defined operating parameters (e.g., user settings for temperature and/or humidity of space 2302), which may be stored in memory accessible by the processor of the controller 2310, and generating and communicating control signals for one or more of the components of the system 2300 to efficiently operate or utilize the IEC 2320 and provide the cooled and/or conditioned air output 2322.

Besides the IEC 2320, the cooling system 2300 is shown to include a liquid desiccant (LD) dehumidifier 2330 that provides LD to the IEC 2320. Operation of the IEC 2320 is not controlled directly by the controller 2310 as shown in FIG. 23. Instead, one technique for controlling the IEC is to control the LD dehumidifier 2330, and the controller 2310 performs this function by generating and communicating a control signal 2333 to an airflow control device 2332 such as a fan, a damper, or the like providing supply air 2334 to the LD dehumidifier 2330. The supply air 2334 is provided at a particular flow rate, $m_{SA}$ (supply air flow rate, variable speed, that is supplied to the building at 2322), which is one operating parameter for the system 2300 that may be controlled by the controller 2310 according to the control methods of the present description. The LD dehumidifier 2330 also has its operation controlled by the controller 2310 generating and communicating a second control signal 2337 that is transmitted to another airflow control device 2336 that provides an exhaust airstream, E1 or 2338, that is provided at a particular flow rate, $m_{E1}$, which is another of the operating parameters/variables for the system 2300 that may be controlled by the controller 2310 to control the IEC 2320 and the output 2322.

The controller 2310 also may control operation of the IEC 2320 by generating and communicating control signals 2329 for an airflow control device (e.g., a fan, a damper, or the like) 2328 used to set the IEC exhaust airstream, E2 or 2324, that is discharged from the IEC at particular flow rate, $m_{E2}$. This is another of the operating parameters/variable for the system 2300 that may be controlled by the controller to control operation of the IEC 2320 and affect the air product 2322 provided to space 2302.

The cooling system 2300 further includes a LD tank 2340, in which the liquid desiccant concentration, CLD, is set or provided in the system 2300 prior to the LD 2344 being pumped to the LD dehumidifier 2330 by liquid pump 2342. An LD regenerator 2350 is also provided to regenerate the liquid desiccant 2348 pumped by liquid pump 2346 from the LD tank 2340 prior to its return to the LD tank 2340 and LD dehumidifier 2330. The liquid desiccant concentration, CLD, is an operating parameter that may be controlled by the controller 2310 by providing control signals 2347 (generated according to the methods taught herein) to the liquid pump 2346 to set the LD flow rate, $m_{regen}$, of LD 2348 to the LD regenerator 2350. The controller 2310 also acts to control operation of the LD dehumidifier 2330 and, as a result, the IEC 2320, by setting the flow rate, $m_{LD}$, of LD 2344 to the LD dehumidifier 2330 by using signals 2343 to set the speed of the variable speed pump 2342.

The cooling system 2300 further includes a number of sensors for collecting temperature and/or humidity data (operating parameters/variables) for the system 2300, and these values for the operating parameters or variable are used by the controller 2310 (or its control programs/software) to generate the control signals 2329, 2333, 2337, 2343, and 2347. In the exemplary system 2300, sensors 2314 and 2318 are provided to collect operating parameter data regarding the product air or output airstream 2322 from the IEC 2320 and regarding the space 2302. In some embodiments of the system 2300, the controller 2310 uses a control method based solely on temperatures, and the sensors 2314, 2318 act to provide data in communications/signals 2315, 2319 corresponding to the temperature, $T_{out}$, of the IEC output airstream 2322 and to the temperature, $T_{space}$, of the space 2302. In other embodiments of the system 2300, the controller 2310 uses this temperature information ($T_{out}$ and $T_{space}$) but also uses/processes the relative humidity, $RH_{space}$, of the space 2302 and the humidity of the outlet, $\omega_{out}$, and the sensor(s) 2318 may measure and provide this type of data in signals/communications 2319 to the controller 2310. Further, the controller 2310 operate to control or achieve a particular humidity ratio, $\omega_{out}$, as measured by the sensor(s) 2314 at the IEC/DEVAP outlet and provided by the airstream 2322 output through the IEC 2320 as shown in FIG. 23.

With the system 2300 in mind, it may now be useful to discuss control methods that may be implemented by the controller 2310. The first method uses temperature sensors 2314, 2318 only while the second method also uses humidity sensors 2318. As will be clear from the following discussion, the methods implemented by the controller 2310 each uses a combination of fixed algorithms or software (or hardware-implemented) routines to generate feedback controls (e.g., control signals 2329, 2333, 2337, 2343, and/or 2347) that control operation of a cooling system 2300 with an IEC 2320. The following teaches these two control methods with a textual description followed by an equation-based description and then by a control-flow diagram of each method. It is believed that these three differing ways of describing the control methods will provide a full and in depth understanding control of an IEC-based cooling system to those skilled in the arts.

First, an IEC control method may be implemented with the controller 2310 that uses temperature-only sensors 2314, 2318 providing temperature data, $T_{out}$, $T_{space}$, in measurement signals 2315, 2319. Variables or parameters that are used in this control method include: T_space (building space temperature measured by sensor 2318); T_space_SP (setpoint for building space temperature, which is typically set by the resident of the space 2302 or operator of cooling system 2300); T_out (temperature at outlet of IEC or DEVAP 2320 measured by sensor 2314); and T_out_SP (setpoint for temperature at DEVAP or IEC outlet typically calculated by the controller 2310).

In the temperature-based method, the supply air flow rate, m_SA, provided to the LD dehumidifier 2330 is controlled based on the space temperature, T_space, by the equation m_SA=ctrl(T_space, T_space_SP). In this control equation, ctrl( ) signifies that the variable (here supply air flow rate, m_SA) is controlled based on the variable or parameters within the parentheses. In this case, this would involve the controller comparing the temperature set point for the building space, T_space_SP, with the measured temperature of the space, T_space. The supply air flow rate, m_SA, is controlled by the controller 2310, based on the comparison of measured temperature to set temperature, by using feedback control, such as deadband control, proportional control, or a proportional-integrator-differential (PID) control. In general, when the measured temperature of the space, T_space, increases, the controller 2310 will transmit feedback control signals 2333 to the airflow control device 2332 to increase the flow rate, m_SA, of the supply air flow 2334 (and vice versa with decreasing measured temperatures of the space 2302).

The outlet temperature setpoint, T_out_SP, is a function of this mass flow rate, m_SA, with it generally decreasing as mass flow rate increases as shown by T_out_SP=f(m_SA, T_space). The outlet temperature setpoint, T_out_SP, is also a function of the space temperature, T_space, with lower space temperatures requiring a lower outlet temperature setpoint, or times when the space temperature (T_space) is much higher than the setpoint (T_space_SP), which is indicated with a high supply air flow rate (m_SA), also requiring a lower outlet temperature setpoint. In the above equation, f( ) is intended to signify that a variable is a calculated value (by the controller 2310 or its software/coded algorithms) determined as a function of the variables in the parentheses (as opposed to being controlled by setpoint and feedback variables).

In the temperature-based control method, the controller 2310 controls both the LD flow rate, m_LD, to the LD dehumidifier 2330, and the ratio, EAF2 of exhaust air, m_E2, to supply air flow rate, m_SA (given by: EAF2=m_E2/m_SA) based on the outlet temperature, T_out, of the IEC 2320. This control can be provided by the following two control equations: (1) m_LD=ctrl(T_out, T_out_SP) and (2) EAF2=ctrl (T_out, T_out_SP_min). With regard to the first of these equations, the liquid pump 2342 is controlled via signals 2343 to increase flow of liquid desiccant 2344 when the temperature, T_out, measured for outlet air 2322 is too low relative to the setpoint temperature, T_out_SP (and vice versa). This "increased flow rate" can mean a variable speed pump increases the flow rate or that the cycling rate of a constant speed pump is increased. Providing more desiccant will reduce the dewpoint of the air used in exhaust air, E2, enabling lower temperatures. The variable or parameter, T_out_SP_min, is the minimum possible outlet temperature. The use of this minimum by the controller 2310 prevents the outlet air 2322 from the IEC 2320 from being too cold during very dry conditions.

The ratio, EAF1, of exhaust air 2338 through the LD dehumidifier 2330 to the supply air 2334 flow rate through the LD dehumidifier 2330 is a function of the liquid desiccant flow rate, m_LD, and the outlet temperature, T_out. This can be stated with the following control equation: EAF1=f(m_LD, T_out). The ratio, EAF1, is coupled to the liquid desiccant flow rate because it cools the liquid desiccant, enabling more dehumidification. The ratio, EAF1, is also used by the controller 2310 for additional evaporative cooling if the ratio, EAF2, is not sufficient to maintain a low enough outlet temperature, T_out.

Further, the liquid desiccant concentration, C_LD, may be controlled with a deadband or other controller via controls signals 2347 to pump 2346 feeding the LD regenerator 2350. This acts to reconcentrate the entire LD tank 2340 when the concentration, C_LD, falls to a level that is too low to meet the load on the cooling system 2300. This is the case when the LD flow rate, m_LD, reaches its maximum flow rate as stated by the following control equation: C_LD=ctrl(m_LD, m_LD-max, C_LD_max). Typically, the controller 2310 generates control signals 2347 to cause the regenerator 2350 to remain on until the liquid desiccant concentration, C_LD, equals the maximum liquid desiccant concentration, C_LD_max.

The following equations are useful for defining and understanding control of an IEC-based cooling system, such as system 2300 of FIG. 23, based on temperature sensors only. In the equations, the following abbreviations are used (in addition to those set out in the prior paragraphs and with reference to FIG. 23): SP=setpoint; FB=feedback; HL=high limit; LL=low limit; UDB=upper deadband; and LDB=lower deadband.

$$\dot{m}_{SA} = ctrl \begin{bmatrix} SP = T_{SP,space} \\ FB = T_{space} \\ HL = \text{constant} \\ LL = \text{constant} \end{bmatrix} \quad \text{Equation 1}$$

$$T_{SP,out} = f(\dot{m}_{SA}, T_{space}) \quad \text{Equation 2}$$

$$T_{SP,out,min} = f(T_{space}) \quad \text{Equation 3}$$

$$\dot{m}_{LD} = ctrl \begin{bmatrix} SP = T_{SP,out} \\ FB = T_{out} \\ HL = \text{constant} \\ LL = \text{constant} \end{bmatrix} \quad \text{Equation 4}$$

$$EAF_2 = ctrl \begin{bmatrix} SP = T_{SP,out,min} \\ FB = T_{out} \\ HL = f((\dot{m})_{LD}) \\ LL = f(\dot{m}_{LD}) \end{bmatrix} \quad \text{Equation 5}$$

$$EAF_1 = f(\dot{m}_{LD}, T_{out}) \quad \text{Equation 6}$$

$$C_{LD} = ctrlDB \begin{bmatrix} UDB(ON) : \dot{m}_{LD,max} \\ LDB(OFF) : C_{LD} = C_{LD,max} \end{bmatrix} \quad \text{Equation 7}$$

FIG. 24 illustrates a control flow diagram 2400 for implementing the temperature sensor-only control method by a controller or within a cooling system with an IEC. As shown, the flow or method includes several user or operator inputs including: a temperature setpoint for a cooled space, $T_{SP,space}$, at 2410; a maximum liquid desiccant flow rate, $m_{LD,max}$, at 2414; and a liquid desiccant concentration maximum, $C_{LD,max}$, at 2418. For example, the user of a cooled space may set, with a thermostat, a desired space temperature while the operator of the cooling system may set the operating parameters for the liquid desiccant. In FIG. 24, it can be seen that two temperature readings are obtained by sensors. Particular, the space temperature, $T_{space}$, is measured at 2420 while the temperature, $T_{out}$, of the airstream at the outlet of the IEC is measured at 2424.

The flow diagram 2400 illustrates that a controller then may use the values of these two sets of variables or operation parameters to perform a set of calculations and then, based on these calculations, to control a number of system components. Particularly, the controller acts at 2430 to control the supply air flow rate, $m_{SA}$, based on a comparison of the measured space temperature, $T_{space}$, and the user input temperature setpoint, $T_{SP,space}$. Based on the space temperatures obtained at 2410, 2420 and the control of the supply air flow rate at 2430, the controller then acts at 2440, 2444 to calculate or look up the setpoint outlet temperature minimum, $T_{SP,out,min}$, and the setpoint, $T_{SP,out}$.

These two values obtained at 2440, 2444 are then used, along with the measured temperature, $T_{out}$, at the IEC outlet, by the controller to control at 2432 and 2434 the ratio, EAF2, of exhaust air, E2, to supply air flow rate, $m_{SA}$, and the LD flow rate, $m_{LD}$, to the LD dehumidifier. The control at 2434 of the LD flow rate, $m_{LD}$, along with the user inputs 2414, 2418 are used by the controller to control 2436 the liquid desiccant concentration, $C_{LD}$. The controller also calculates at 2446 the ratio, EAF1, based on the measured airstream temperature, $T_{out}$, at the IEC outlet and the controlled liquid desiccant flow rate, $m_{LD}$.

With the temperature-sensor only method understood, an IEC control method may be described and implemented with the controller 2310 that uses temperature and relative humidity sensors 2314, 2318 providing temperature data, $T_{\_out}$, $T_{\_space}$, and $RH_{space}$ in measurement signals 2315, 2319. Variables or parameters that are used in this control method include: T_space (building space temperature measured by sensor 2318); T_space_SP (setpoint for building space temperature, which is typically set by the resident of the space 2302 or operator of cooling system 2300); T_out (temperature at outlet of IEC or DEVAP 2320 measured by sensor 2314); T_out_SP (setpoint for temperature at DEVAP or IEC outlet typically set by operator of cooling system 2300); RH_space (building space relative humidity); RH_space_SP (setpoint for building space relative humidity); w_out (measured humidity ratio at IEC or DEVAP outlet); and w_out_SP (setpoint for humidity ratio at IEC or DEVAP outlet).

In the temperature and humidity-based method, the supply air flow rate, m_SA, to the LD dehumidifier 2330, is controlled based on the space temperature and space relative humidity as shown by the control equation: m_SA=ctrl (T_space, T_space_SP, RH_space, RH_space_SP). A control signal will likely be calculated by the controller 2310 based on both the sensible load (T_space) and latent load (RH_space), and the larger signal will be used to control the supply air flow rate, m_SA, such as with control signal 2333 to air control device 2332.

The two outlet setpoints are then calculated by the controller 2310 based on the following: (1) T_out_SP=f(T_space, T_space_SP, RH_space, RH-space_SP) and (2) w_out_SP=f (T_space, T_space_SP, RH_space, RH_space_SP). The humidity setpoint, w_out_SP, will depend more strongly on the space temperature, T_space, and the temperature setpoint, T_space_SP, than the relative humidity of the space, RH_space and RH_space_SP.

The outlet humidity ratio setpoint, w_out_SP, will depend on all four of these variables because it is strongly linked to maintaining the relative humidity in the space 2302 by reducing the humidity. It will also depend on the space temperature, T_space, and the setpoint temperature, T_space_SP, because if the setpoint is not being maintained, the humidity may need to be decreased. Since the indirect evaporative cooler (IEC) has a finite dewpoint effectiveness, a lower humidity will enable a lower outlet temperature to be achieved and/or maintained with the IEC. This enables a higher flow rate for E2 during dry periods, when it is more efficient to use a high E2 flow rate.

With these outlet setpoints determined, the liquid desiccant flow rate, m_LD, can be used by the controller 2310 via signals 2343 to control the outlet humidity, w_out, as shown by the control equation: m_LD=ctrl(w_out, w_out_SP). The controller 2310 will attempt to control the IEC outlet temperature, $T_{out}$ using the ratio, EAF2, of exhaust air, E2, to supply air flow rate m_SA based on the following control equation: EAF2=ctrl(T_out, T_out_SP)×f(RH)space). The relative humidity, RH_space, of the space 2302 is used to set the bounds for the ratio, EAF2, with lower relative humidity setting a higher bound for the ratio, EAF2.

The ratio, EAF1, of exhaust air, E1, to supply air flow rate, m_SA, is generally tied or linked to the liquid desiccant flow rate, m_LD, to the LD dehumidifier 2330 since both increase the dehumidification provided by the cooling system 2300. But, the ratio, EAF1, is also used by the controller 2310 to provide increased sensible cooling when needed so that the airstream temperature, T_out, at the outlet of the IEC 2320 can meet the desired setpoint, T_out_SP. This is given by the following control/function equation: EAF1=f(m_LD, T_out, T_out_SP). The liquid desiccant concentration, C_LD, is controlled in this method in the same way as it is controlled in the above-described temperature sensor only-based method.

The following equations are useful for defining and understanding control of an IEC-based cooling system, such as system 2300 of FIG. 23, based on measurement signals from both temperature and humidity sensors. In the equations, the following abbreviations are used (in addition to those set out in the prior paragraphs and with reference to FIG. 23): SP=setpoint; FB=feedback; HL=high limit; LL=low limit; UDB=upper deadband; and LDB=lower deadband.

$$\dot{m}_{SA} = ctrl \begin{bmatrix} SP = T_{SP,space}; RH_{SP,space} \\ FB = T_{space}; RH_{space} \\ HL = \text{constant} \\ LL = \text{constant} \end{bmatrix} \quad \text{Equation 8}$$

$$T_{SP,out} = f(T_{space}, T_{SP,space}, RH_{space}, RH_{SP,space}) \quad \text{Equation 9}$$

$$\omega_{Sp,out} = f(T_{space}, T_{SP,space}, RH_{space}, RH_{SP,space}) \quad \text{Equation 10}$$

$$\dot{m}_{LD} = ctrl \begin{bmatrix} SP = \omega_{SP,out} \\ FB = \omega_{out} \\ HL = \text{constant} \\ LL = \text{constant} \end{bmatrix} \quad \text{Equation 11}$$

$$EAF_2 = ctrl \begin{bmatrix} SP = T_{SP,out} \\ FB = T_{out} \\ HL = f(RH_{spcae}) \\ LL = f(RH_{space}) \end{bmatrix} \quad \text{Equation 12}$$

$$EAF_1 = f(\dot{m}_{LD}, T_{out}, T_{SP,out}) \quad \text{Equation 13}$$

$$C_{LD} = ctrlDB \begin{bmatrix} UDB(ON)\dot{m}_{LD} = \dot{m}_{LD,max} \\ LDB(OFF)C_{LD} = C_{LD,max} \end{bmatrix} \quad \text{Equation 14}$$

FIG. 25 illustrates a control flow diagram 2500 for implementing the temperature and humidity sensor control method by a controller or within a cooling system with an IEC. As shown, the flow or method includes several user or operator inputs including: a temperature setpoint for a cooled space, $T_{SP,space}$, at 2510; a relative humidity setpoint for the cooled space, $RH_{SP,space}$, at 2514; a maximum liquid desiccant flow rate, $m_{LD,max}$, at 2516; and a liquid desiccant concentration maximum, $C_{LD,max}$, at 2518. For example, the user of a cooled space may set, with a thermostat, a desired space temperature and a desired humidity level while the operator of the cooling system may set the operating parameters for the liquid desiccant.

In FIG. 25, it can be seen that two temperature readings are obtained by sensors. Particular, the space temperature, $T_{space}$, is measured at 2520 while the temperature, $T_{out}$, of the airstream at the outlet of the IEC is measured at 2524. Further, sensors are provided in the cooling system to measure the relative humidity of the space, $RH_{space}$, at 2526, and to measure the outlet humidity, $\omega_{out}$, at 2528. This outlet humidity would likely be calculated by the controller 2310 using the outlet temperature ($T_{out}$) and a measurement of the outlet relative humidity ($RH_{out}$).

The flow diagram 2500 illustrates that a controller then may use the values of these two sets of variables or operation parameters (user set and measured) to perform a set of calculations and then, based on these calculations, to control a number of system components. Particularly, the controller acts at 2530 to control the supply air flow rate, $m_{sA}$, based on a comparison of the measured space temperature and relative humidity with setpoint values for temperature and humidity in the space. Also, based on the data provided and measured in 2510, 2514, 2520, 2526, the controller acts to calculate at 2540 and 2542 the outlet humidity setpoint, $\omega_{SP,out}$, and the temperature setpoint, $T_{SP,out}$, at the IEC outlet.

The controller is shown in diagram 2500 to act to control at 2532 the ratio, EAF2, based on the temperature set point calculated at 2542, the relative humidity measured at 2526, and the IEC outlet temperature measured at 2524. Further, the controller is shown at 2534 to control the liquid desiccant flow rate, $m_{LD}$, based on the outlet humidity setpoint for the IEC calculated at 2540 and the outlet humidity measured at 2528. Finally, the diagram 2500 is useful for showing at 2536 that the liquid desiccant concentration, $C_{LD}$, is controlled by the controller acting at 2534 to control the liquid desiccant flow rate, $m_{LD}$, and is based upon the user inputted values at 2516 and 2518 for maximums of LD flow and LC concentration.

Several means are available to implement the systems and methods discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors." For example, in one embodiment, signal processing may be incorporated by an FPGA or an ASIC, or alternatively by an embedded or discrete processor. Therefore, other embodiments include program instructions resident on computer readable media which when implemented by such means enable them to implement various embodiments. Computer readable media include any form of a non-transient physical computer memory device. Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to, computer-executable instructions executed by computer system processors and hardware description languages such as Very High Speed Integrated Circuit (VHSIC) Hardware Description Language (VHDL).

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope.

What is claimed is:

1. A control method for operating a cooling system with an indirect evaporative cooler to maintain a temperature of an enclosed space, comprising:
   operating an airflow control device to provide supply air at a flow rate to a liquid desiccant dehumidifier, wherein the supply air flows through the liquid desiccant dehumidifier and an indirect evaporative cooler prior to being ejected from an outlet of the indirect evaporative cooler in fluid communication with a space;
   operating a pump to provide liquid desiccant at a flow rate to the liquid desiccant dehumidifier;
   sensing a temperature of an airstream at the outlet of the indirect evaporative cooler;
   comparing the temperature of the airstream at the outlet to a setpoint temperature at the outlet; and
   controlling the operating of the pump to set the flow rate of the liquid desiccant based on the comparing step.

2. The control method of claim 1, further comprising:
   sensing a temperature of the space;
   comparing the temperature of the space with a setpoint temperature for the space; and
   controlling the operating of the airflow control device to set the flow rate of the supply air based on the comparing of the temperature of the space with the setpoint temperature for the space.

3. The control method of claim 2, wherein the controlling steps are performed using feedback control of the air control device and the pump.

4. The control method claim 3, wherein the feedback control is provided using at least one of deadband control, proportional control, and proportional-integral-differential (PID) control.

5. The control method of claim 1, further comprising determining the setpoint temperature at the outlet as a function of a temperature of the space.

6. The control method of claim 1, further comprising controlling an airflow control device to provide exhaust airflow through the indirect evaporative cooler at a rate determined based on a comparison of the temperature of the airstream at the outlet to a minimum setpoint temperature for the outlet and based on the flow rate of the liquid desiccant.

7. The control method of claim 6, wherein the minimum setpoint temperature for the outlet is determined based on a temperature of the space.

8. The control method of claim 1, further comprising controlling an airflow control device to provide exhaust airflow through the liquid desiccant dehumidifier based on the flow rate of the liquid desiccant to the liquid desiccant dehumidifier and based on the temperature of the airstream at the outlet.

9. The control method of claim 1, further comprising selectively operating a regenerator for the liquid desiccant to maintain the flow rate to the liquid desiccant dehumidifier within a predefined flow rate range.

10. A method of controlling a system with an indirect evaporative cooler to maintain temperature and relative humidity of a space, comprising:
    operating an airflow control device to provide supply air at a flow rate to a liquid desiccant dehumidifier, wherein the supply air flows through the liquid desiccant dehumidifier and an indirect evaporative cooler prior to being ejected from an outlet of the indirect evaporative cooler in fluid communication with a space;
operating a pump to provide liquid desiccant at a flow rate to the liquid desiccant dehumidifier;
sensing a temperature of the space;
sensing a relative humidity of the space;
comparing the temperature of the space with a temperature setpoint of the space and the relative humidity of the space with a relative humidity setpoint for the space; and
controlling the operating of the airflow control device to adjust the flow rate of the supply air based on the comparing step.

11. The control method of claim 10, further comprising:
sensing a temperature of an airstream at the outlet of the indirect evaporative cooler; and
controlling an airflow control device to provide exhaust airflow through the indirect evaporative cooler at a rate based on a comparison of the temperature of the airstream at the outlet to a setpoint temperature for the outlet.

12. The control method of claim 11, wherein the setpoint temperature for the outlet is determined based on the temperature and the relative humidity of the space and the setpoints for the space temperature and the space relative humidity.

13. The control method of claim 11, wherein the exhaust airflow rate is maintained within a range and wherein the range has upper and lower bounds determined based on the relative humidity of the space.

14. The control method of claim 10, wherein the controlling steps are performed using feedback control of the air control device and the pump.

15. The control method claim 14, wherein the feedback control is provided using at least one of deadband control, proportional control, and proportional-integral-differential (PID) control.

16. The control method of claim 10, further comprising determining a humidity ratio setpoint for the outlet of the indirect evaporative cooler based on the temperature and the relative humidity of the space and the setpoints for the space temperature and the relative humidity and wherein the controlling of the pump is performed to set the liquid desiccant flow rate based on a humidity ratio and the humidity ratio setpoint for the outlet of the indirect evaporative cooler.

17. The control method of claim 10, further comprising controlling an airflow control device to provide exhaust airflow through the liquid desiccant dehumidifier based on the flow rate of the liquid desiccant to the liquid desiccant dehumidifier and based on the temperature of the airstream at the outlet.

18. The control method of claim 10, further comprising selectively operating a regenerator for the liquid desiccant to maintain the flow rate to the liquid desiccant dehumidifier within a predefined flow rate range.

19. A cooling system using indirect evaporative cooling to maintain temperature of a building space, comprising:
an indirect evaporative cooler with a liquid desiccant dehumidifier;
an airflow control device operable to provide supply air to the liquid desiccant dehumidifier, wherein after cooling the supply air is output from an outlet of the indirect evaporative cooler and into the building space;
a pump operable to provide liquid desiccant to the liquid desiccant dehumidifier;
a sensor sensing temperature of the cooled supply air at the outlet of the indirect evaporative cooler; and
a controller operating the pump to provide a flow rate of the liquid desiccant, the flow rate being determined based on a comparison of the sensed temperature at the outlet and an outlet setpoint temperature.

20. The cooling system of claim 19, further comprising a sensor sensing a temperature in the building space, wherein the controller operates the airflow control device to set a flow rate of the supply air based on a comparison of the temperature in the building space with a setpoint temperature for the building space.

21. The cooling system of claim 19, further including an airflow control device operable to provide exhaust airflow through the indirect evaporative cooler, wherein the controller operates the airflow control device to provide the exhaust airflow at a rate selected based on a comparison of the temperature of the airstream at the outlet and a minimum setpoint temperature for the outlet of the indirect evaporative cooler.

22. The cooling system of claim 19, further including an airflow control device operable to provide exhaust airflow through the liquid desiccant dehumidifier, wherein the controller operates the airflow control device to provide the exhaust airflow at a rate selected based on the flow rate of the liquid desiccant and on the temperature of the airstream at the outlet.

23. The cooling system of claim 19, further comprising a liquid desiccant regenerator, wherein the controller operates the liquid desiccant regenerator to maintain the flow rate of the liquid desiccant within a predefined flow rate range.

24. The cooling system of claim 19, further comprising sensors sensing a temperature and a relative humidity within the building space, wherein the controller first compares the temperature of the building space with a temperature setpoint of the building space and the relative humidity of the space with a relative humidity setpoint for the building space and second operates the airflow control device to adjust the flow rate of the supply air based on the comparing using the building space temperature and the building space relative humidity.

25. The cooling system of claim 19, further comprising an airflow control device operable to provide exhaust airflow through the indirect evaporative cooler, wherein the controller operates the airflow control device to provide the exhaust airflow at a rate set based on a comparison of the temperature of the airstream at the outlet and a setpoint temperature for the outlet and wherein the exhaust airflow is maintained by the controller within a range that has upper and lower bounds determined by the controller based on the relative humidity of the building space.

* * * * *